US009795838B2

(12) United States Patent
Kikel

(10) Patent No.: US 9,795,838 B2
(45) Date of Patent: Oct. 24, 2017

(54) WOBBLY BALL

(71) Applicant: Keith R. Kikel, West Jordan, UT (US)

(72) Inventor: Keith R. Kikel, West Jordan, UT (US)

(*) Notice: Subject to any disclaimer, the term of this patent is extended or adjusted under 35 U.S.C. 154(b) by 437 days.

(21) Appl. No.: 14/452,962

(22) Filed: Aug. 6, 2014

(65) Prior Publication Data

US 2016/0038793 A1 Feb. 11, 2016

(51) Int. Cl.
A63B 43/04 (2006.01)
H02K 7/18 (2006.01)
(Continued)

(52) U.S. Cl.
CPC .............. A63B 43/04 (2013.01); A01B 29/00 (2013.01); A01B 45/00 (2013.01); A01B 45/02 (2013.01); A01D 34/001 (2013.01); A63B 21/00061 (2013.01); A63B 21/023 (2013.01); A63B 21/0552 (2013.01); A63B 21/0608 (2013.01); A63B 21/1618 (2013.01); A63B 21/1663 (2013.01); A63B 21/4035 (2015.10); A63B 23/03508 (2013.01); A63B 23/03541 (2013.01); A63B 23/1209 (2013.01); A63B 23/16 (2013.01); F03G 5/00 (2013.01); F03G 5/06 (2013.01); F03G 5/08 (2013.01); H02K 1/34 (2013.01); H02K 7/1853 (2013.01); A63B 5/20 (2013.01); A63B 21/0054 (2015.10);
(Continued)

(58) Field of Classification Search
CPC ....... A63F 2007/4012; A63F 2250/063; A63B 43/04; A63B 43/00; A63B 37/10; A63B 37/14; A63B 2225/01; A63B 21/0608; A63B 21/23; A63B 21/0607; H02K 1/34; H02K 7/1853; H02K 7/1892; H02K 2201/18
USPC .................................................. 473/351, 594
See application file for complete search history.

(56) References Cited

U.S. PATENT DOCUMENTS 442,675 A * 12/1890 Wilcox ................ A63B 67/086
473/514
996,458 A * 6/1911 Coleman ................ A63F 7/044
273/115
(Continued)

FOREIGN PATENT DOCUMENTS

FR 846327 A * 9/1939 ............. A63B 43/04
FR 2549732 A1 * 2/1985 ............. A63B 43/04
(Continued)

Primary Examiner — Burton Mullins
(74) Attorney, Agent, or Firm — Workman Nydegger

(57) ABSTRACT

The present invention relates to wobbly balls and exercise coil springs. A wobbly ball may include a non-spherical rigid, hollow ball body formed of two halves, each half comprising an upper ladle or a lower ladle which are welded together along a central seam therebetween, and defining a hollow cavity therein. A spherical inner ball is captured within the hollow cavity of the hollow ball body of the wobbly ball, so that upon movement of the wobbly ball, the inner ball rolls within the cavity, producing a wobbly, eccentric motion. The exercise coil spring may be formed of a single coiled wire, the coiled spring including a central portion where the coiled wire is coiled to a first diameter that is constant. Opposed flared ends are provided ends of the central portion where the coiled wire is progressively coiled from the first diameter to a second diameter, which is greater.

16 Claims, 25 Drawing Sheets

(51) Int. Cl.
| | |
|---|---|
| H02K 35/00 | (2006.01) |
| A63B 21/02 | (2006.01) |
| A01B 45/02 | (2006.01) |
| A01B 29/00 | (2006.01) |
| H02K 1/34 | (2006.01) |
| A01B 45/00 | (2006.01) |
| A01D 34/00 | (2006.01) |
| A63B 21/055 | (2006.01) |
| A63B 21/16 | (2006.01) |
| A63B 23/035 | (2006.01) |
| A63B 23/12 | (2006.01) |
| F03G 5/00 | (2006.01) |
| F03G 5/06 | (2006.01) |
| F03G 5/08 | (2006.01) |
| A63B 23/16 | (2006.01) |
| B63H 16/20 | (2006.01) |
| A63B 21/06 | (2006.01) |
| A63B 21/072 | (2006.01) |
| A63B 21/00 | (2006.01) |
| A63B 71/00 | (2006.01) |
| A63B 71/06 | (2006.01) |
| A63B 5/20 | (2006.01) |
| A63B 21/005 | (2006.01) |
| B62B 5/00 | (2006.01) |
| A63B 21/062 | (2006.01) |

(52) U.S. Cl.
CPC ... *A63B 21/00065* (2013.01); *A63B 21/00069* (2013.01); *A63B 21/00196* (2013.01); *A63B 21/027* (2013.01); *A63B 21/0557* (2013.01); *A63B 21/06* (2013.01); *A63B 21/0628* (2015.10); *A63B 21/0724* (2013.01); *A63B 21/151* (2013.01); *A63B 21/4043* (2015.10); *A63B 23/03525* (2013.01); *A63B 23/1218* (2013.01); *A63B 23/1245* (2013.01); *A63B 2071/009* (2013.01); *A63B 2071/0625* (2013.01); *A63B 2209/08* (2013.01); *A63B 2225/60* (2013.01); *B62B 5/0026* (2013.01); *B63H 2016/202* (2013.01); *H02K 7/1892* (2013.01); *H02K 2201/18* (2013.01)

(56) References Cited

U.S. PATENT DOCUMENTS

| | | | | |
|---|---|---|---|---|
| 2,784,526 A | * | 3/1957 | Bounadere | A63B 43/00 116/170 |
| 2,859,968 A | * | 11/1958 | Modica, Jr. | A63B 43/04 473/594 |
| 3,195,267 A | * | 7/1965 | Gehlen | A63F 7/2472 182/154 |
| 3,357,705 A | * | 12/1967 | Blanchard | A63B 43/00 473/280 |
| 3,712,627 A | * | 1/1973 | Stroud | A63H 15/06 473/595 |
| 3,930,650 A | * | 1/1976 | Watson | A63B 43/002 273/DIG. 8 |
| 3,995,855 A | * | 12/1976 | Schultz | A63B 43/04 446/437 |
| 4,194,737 A | * | 3/1980 | Farmer | A63H 33/005 446/135 |
| 4,411,431 A | * | 10/1983 | Judice | A63B 69/3688 473/200 |
| 4,609,196 A | * | 9/1986 | Bozinovic | A63B 43/04 446/437 |
| 5,294,129 A | * | 3/1994 | Brown | A63B 59/20 273/343 |
| 6,056,622 A | * | 5/2000 | Chung | A63B 43/04 446/435 |
| 2006/0079355 A1 | * | 4/2006 | May | A63B 43/00 473/594 |
| 2007/0037636 A1 | * | 2/2007 | Wong | A63B 43/04 473/415 |
| 2009/0312127 A1 | * | 12/2009 | Kessler | A63B 43/06 473/570 |
| 2015/0367161 A1 | * | 12/2015 | Wiegardt | A63B 21/075 482/93 |

FOREIGN PATENT DOCUMENTS

| | | | | |
|---|---|---|---|---|
| KR | WO 03020378 A1 | * | 3/2003 | A63B 43/04 |
| NL | 1001678 C2 | * | 5/1997 | A63F 7/0076 |
| ZA | WO 2012021908 A2 | * | 2/2012 | A63F 9/0415 |

* cited by examiner

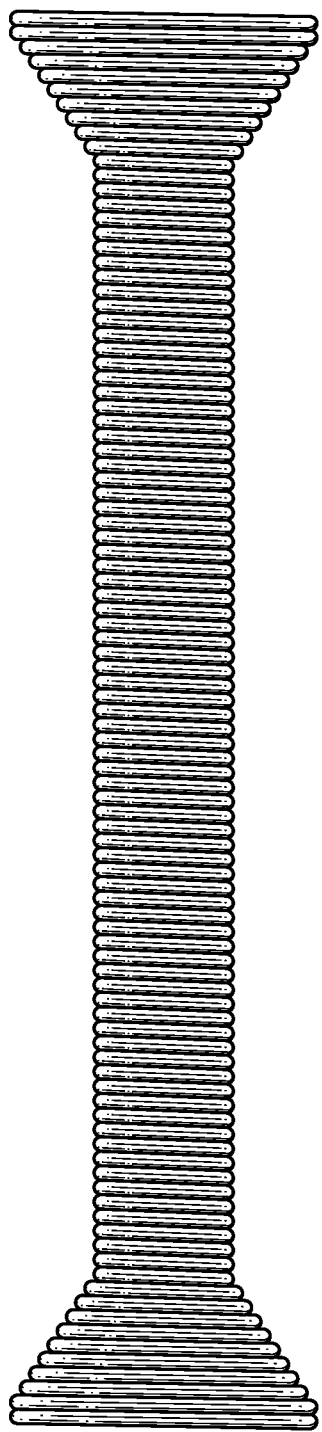 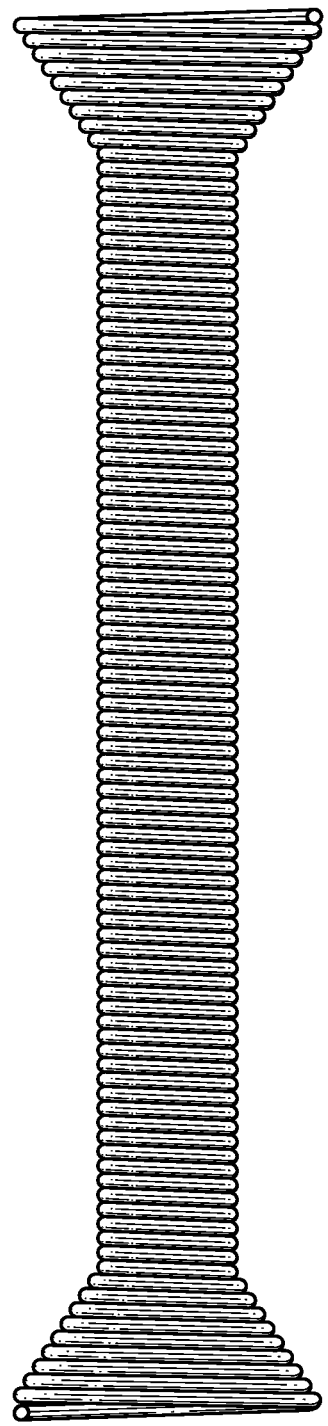
*Fig. 19*          *Fig. 20*

WOBBLY BALL

BACKGROUND OF THE INVENTION

1. The Field of the Invention

The present invention is in the field of wobbly balls and coiled spring devices for use in exercise, as well as other uses.

2. The Relevant Technology

A myriad of various devices are employed for exercise by people the world over in an effort to increase or maintain physical fitness.

Despite the variety of such devices, there remains a continuing need for additional devices providing benefits that currently are not provided for.

BRIEF SUMMARY

The present invention relates to wobbly balls, exercise coil springs, various related devices that may be formed therefrom, and related methods of use. The wobbly ball may be employed as an exercise device, although various other uses are also contemplated (e.g., even as an engine to power or augment efficacy of a power rake, tiller, lawn aerator, lawn mower, boat, car, or other vehicle). Such a wobbly ball may include a non-spherical rigid, hollow ball body, e.g., formed of two halves. Each half may comprise an upper or lower ladle attached (e.g., welded) together along a central seam therebetween. The two halves define a hollow cavity therein. A spherical ball is freely (e.g., free rolling) captured within the hollow cavity of the hollow ball body. The resulting wobbly ball exhibits a wobbly, eccentric character as the spherical ball captured within the ball body freely rolls within the hollow cavity, as the internal cavity defined by the hollow ball body is itself non-spherical. The eccentricity of the cavity's shape causes the ball to wobble as it is held within the hand of a user and manipulated (e.g., which manipulation causes the spherical ball captured in the ball body to roll within the hollow cavity. Such wobbly, eccentric motion provides an excellent exercise to a user's hands, arms, and related musculature as the wobbly ball is manipulated to cause the spherical ball to roll within the ball body.

The present disclosure is also directed to a coil spring for exercise where the spring comprises a single coiled wire such that the coil spring includes a central portion where the coiled wire is coiled to a first diameter (e.g., an outside diameter of the coil spring along its central portion). This first diameter may be constant through the central portion, and the coiled wire may be coiled to include opposed flared ends on either end of the central portion where the coiled wire is progressively coiled from the first diameter to a second diameter that is greater than the first diameter. The opposed flared ends of the coil exercise spring thus serve as handles as a user grips one or both of the ends in a single hand. The spring provides resistive force that can be employed in various exercise movements as the spring is bent. The spring also exhibits a similar wobbly, eccentric movement as it is swung back and forth, which can similarly provide an excellent exercise to a user's hands, arms, and related musculature as the spring is thus swung. The coil exercise spring can also be used to exercise various other body parts, such as between the legs, thighs, etc.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which:

FIG. 19 is a front view of the exercise coil spring of FIG. 17;

FIG. 20 is a rear view of the exercise coil spring of FIG. 17;

DETAILED DESCRIPTION OF THE PREFERRED EMBODIMENTS

I. Introduction

Figure 1:
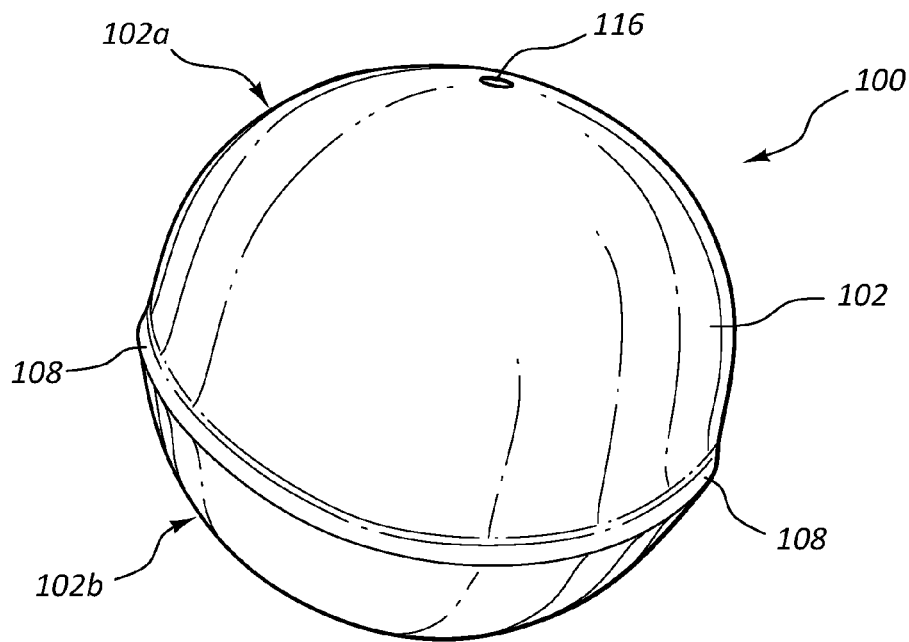
FIG. 1 is a perspective view of an exemplary wobbly ball according to an embodiment of the present invention.
Figure 2:
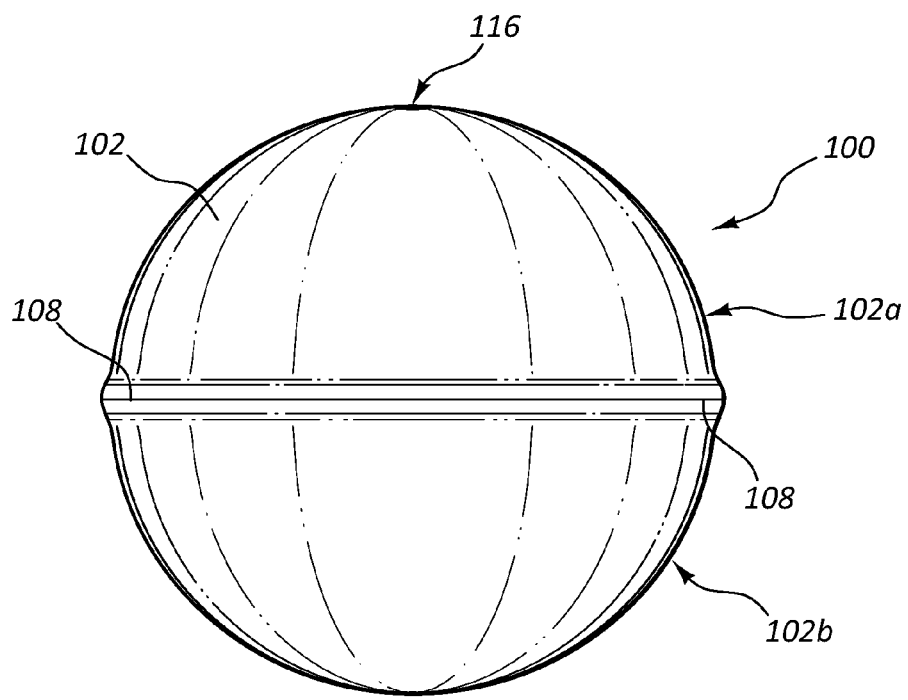
FIG. 2 is a first side view of the wobbly ball of FIG. 1, while the opposite side view is identical.
Figure 3:
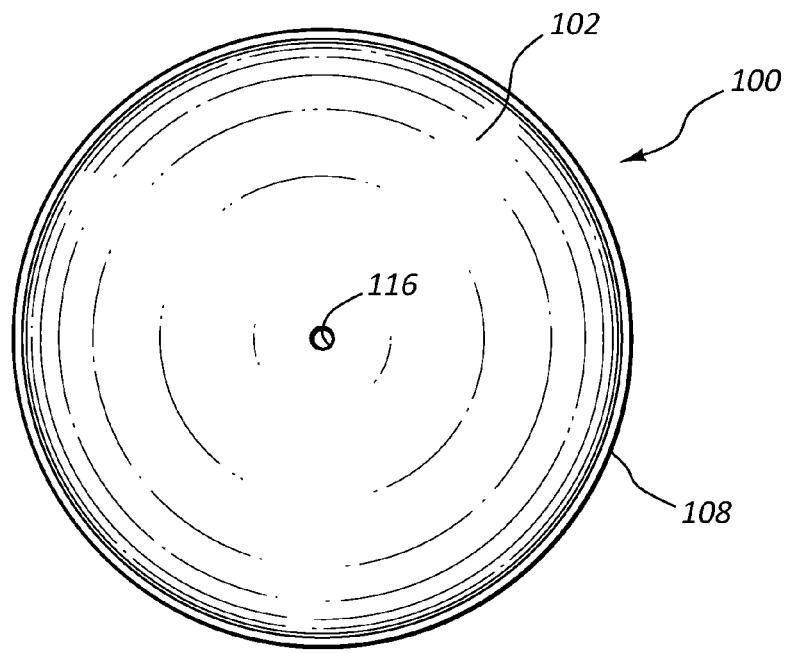
FIG. 3 is a top view of the wobbly ball of FIG. 1.
Figure 4:
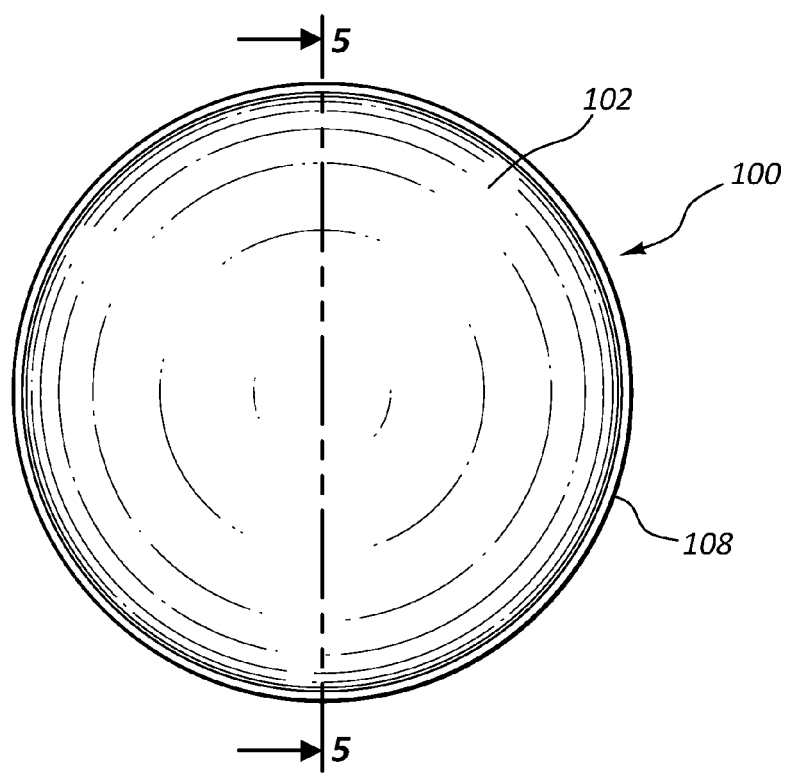
FIG. 4 is a bottom view of the wobbly ball of FIG. 1.

The present invention relates to wobbly balls and exercise coil springs. Such wobbly balls may be employed as an exercise device, or employed for various other uses.

II. Exemplary Wobbly Balls

FIGS. 1-6 illustrate an exemplary wobbly ball 100 according to an embodiment of the present invention. Wobbly ball 100 includes a non-spherical, rigid hollow ball body 102, and a ball (e.g., a spherical ball 104) captured within hollow cavity 106 defined by hollow ball body 102. The ball body 102 may be formed from two halves 102a and 102b, welded together along a central seam 108 therebetween. For example, the two halves are specifically not hemispherical, so that the resulting wobbly ball body 102 is not spherical, but is of an oblong, rounded shape. Each half may be formed of a ladle, so that half 102a is an upper ladle, and half 102b is a lower ladle. For example, a kitchen ladle as obtained from a restaurant supply store, the ladle cupping portion being removed from any handle, and the ladle cupping portions then being welded together. Of course, such ladle cupping portions could be manufactured directly, rather than by disassembling a kitchen ladle with a handle. Such ladles are not hemispherical, so that the resulting body of the wobbly ball is non-spherical. This advantageously provides the wobbly ball with a wobbly, eccentric, unpredictable movement, particularly when an inner ball is captured within the cavity between the ladle halves.

The ball 104 captured within hollow cavity 106 is free to roll anywhere within the cavity 106. Because of the non-spherical shape of the inside surface of the wall of body 102, and the free rolling nature of captured ball 104, wobbly ball 104 exhibits wobbly, somewhat unpredictable characteristics as it is moved within the hand of a user. This wobbly, eccentric, unpredictable nature of the movement an forces associated with the wobbly ball 100 make it particularly well suited for exercising the muscles of the arms, hands, and associated muscles of the chest, shoulders, etc. that are stimulated when manipulating the wobbly ball 100 within the hand of a user.

A lubricant (e.g., a dry lubricant such as graphite) may be disposed within the wobbly ball, on the inside surface of the wall of body 102, and/or the outside surface of the inner ball 104. The inner ball 104 may account for most of the weight or mass of the wobbly ball, such that the ball body 102 comprises a thin outer shell (e.g., of metal, or other similar rigid material) within which the relatively heavy inner ball 104 rolls. For example, the inner ball 104 may account for 75% or more, or 90% or more of the weight of wobbly ball 100.

In addition, the inner ball 104 captured within hollow cavity 106 may have a diameter that is substantially smaller than the height and width of the hollow cavity 106 so as to provide for a relatively large degree of translational movement of ball 104 within cavity 106, as wobbly ball 100 is manipulated. For example, the inner ball 104 may have a diameter that is not more than about 40%, not more than about 45%, or not more than about 50% of the smaller of the height and width of body 102. The inner ball 104 may comprise a Chinese ball (i.e., Baoding ball). Inner ball 104 may be solid, rather than hollow. In an embodiment, the inner ball may be a musical Chinese ball, e.g., including a chiming mechanism therein that generates a chime sounds as it rolls. The inner solid ball may be relatively heavy, e.g., formed of solid steel.

Figure 5:
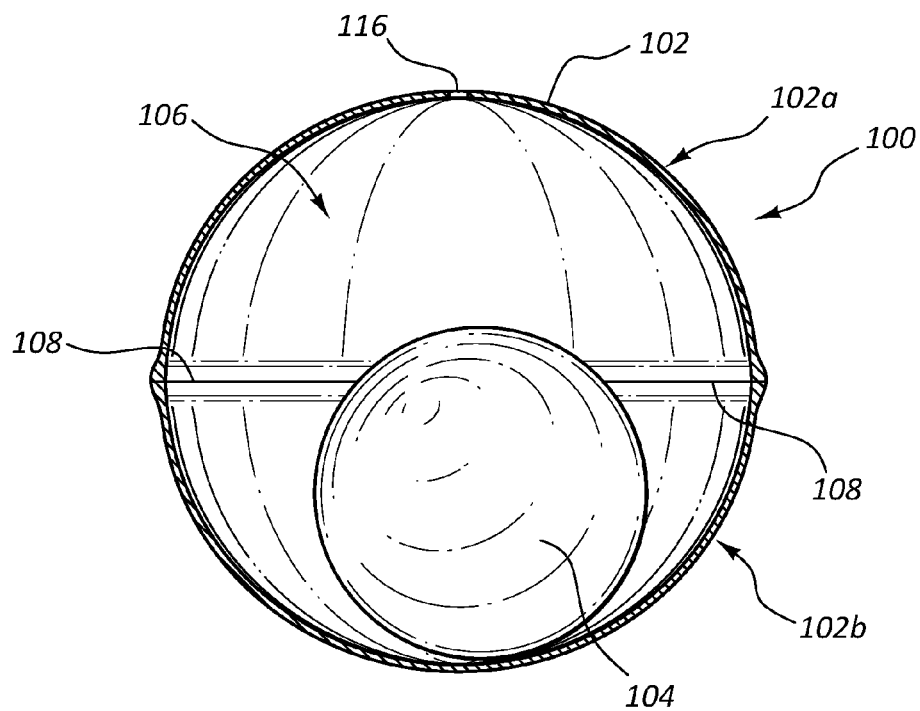
FIG. 5 is a cross-sectional cut-away view of the wobbly ball of FIG. 1, showing a spherical ball captured inside the hollow ball body of the wobbly ball.

Ball body 102 is advantageously non-spherical, so as to enhance its wobbly, eccentric movement characteristics. For example, in an embodiment, the ball body 102 has a maximum width (e.g., defined along seam 108) that is greater than its maximum height. In an embodiment, the wall thickness of body 102 may be substantially constant, although optionally somewhat thicker at seam 108 (e.g., so that the exterior surface of body 102 protrudes outward at welded seam 108, as shown in FIG. 5). As such, both the inner cavity 106 and the outer surface defined by body 102 may be non-spherical. Providing a non-spherical inner cavity 106 advantageously enhances or increases the wobbly, eccentric movement characteristics of the wobbly ball 100 as inner ball 104 rolls over this non-spherical inner surface. Another embodiment could include a varying wall thickness so that the outer surface defined by body 102 could actually be spherical (e.g., thicker adjacent the top and bottom of wobbly ball 100, so that the outside height defined by the ball would equal the outside width).

The wobbly ball may be of any desired size, although generally it may be sized so as to be held within the palm of a user's hand. For example, in an embodiment, it may have a width of about 90 mm and a height that is somewhat less, e.g., about 80-85 mm. For example, the height may be about 90-95% of the width. Larger and smaller sizes are of course possible. A larger wobbly ball may have a width of about 4-6 inches (e.g., about 100-150 mm), or up to about 12 inches (about 300 mm). In an alternative embodiment, two or more inner balls 104 could be included in cavity 106, although better wobbly eccentric motion may be provided with only a single inner ball 104.

The wobbly ball 100 may include an exterior finish, e.g., such as a powder coating to the metal body 102, so as to provide a desired surface color (e.g., red, yellow, green, blue, etc.) and/or texture (e.g., smooth, roughened surface, patterned, etc.) to wobbly ball 100. Such a finish may be applied in a powder coating process and subsequent curing process, as will be familiar to those of skill in the art.

Figure 6:
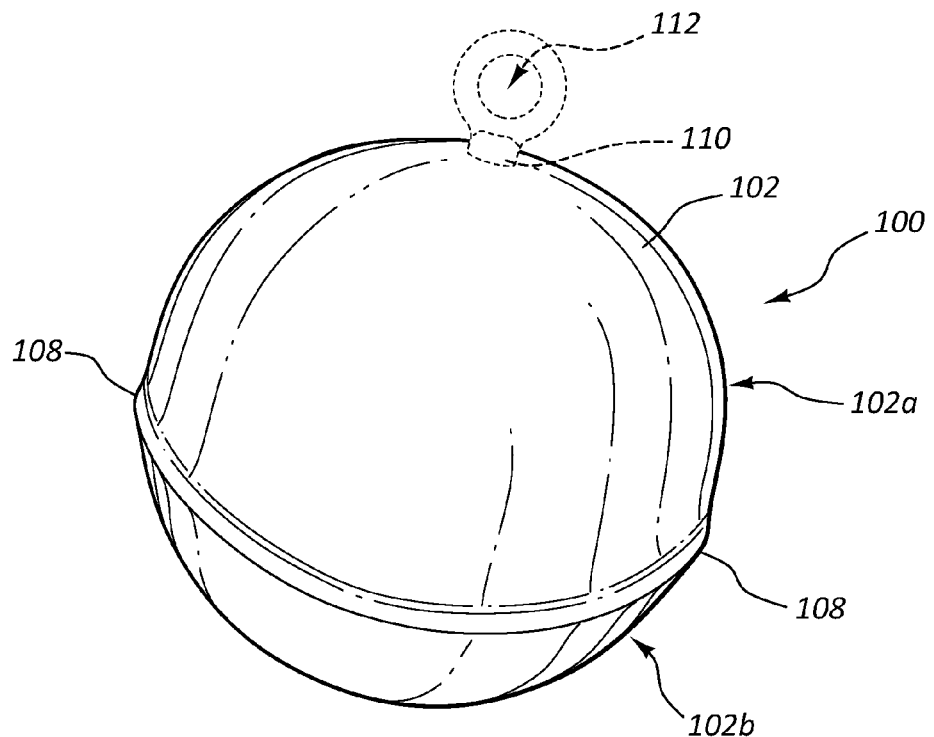
FIG. 6 is a perspective view of the wobbly ball of FIG. 1, showing a bolt with an eyelet attached to a top thereof.
Figures 7, 8:
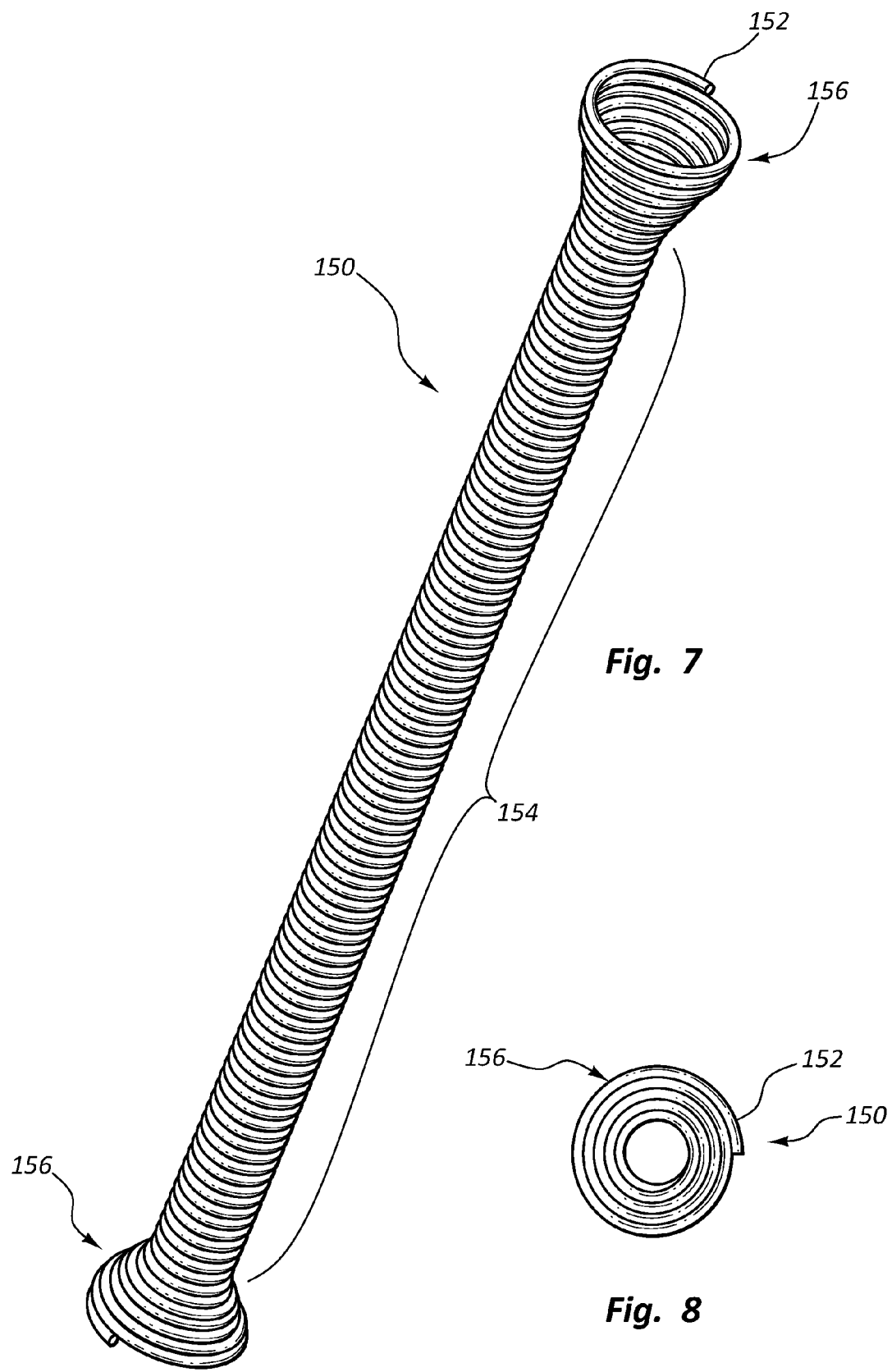
FIG. 7 is a perspective view of an exemplary exercise coil spring according to an embodiment of the present invention.
FIG. 8 is an end view of the exercise coil spring of FIG. 7, the opposite end view being identical.
Figure 9:
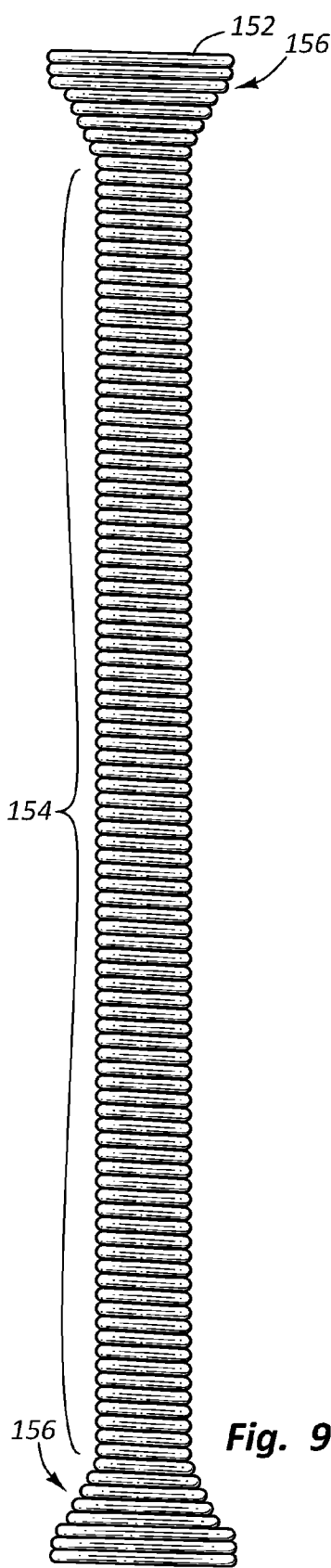
FIG. 9 is a front view of the exercise coil spring of FIG. 7.
Figure 10:
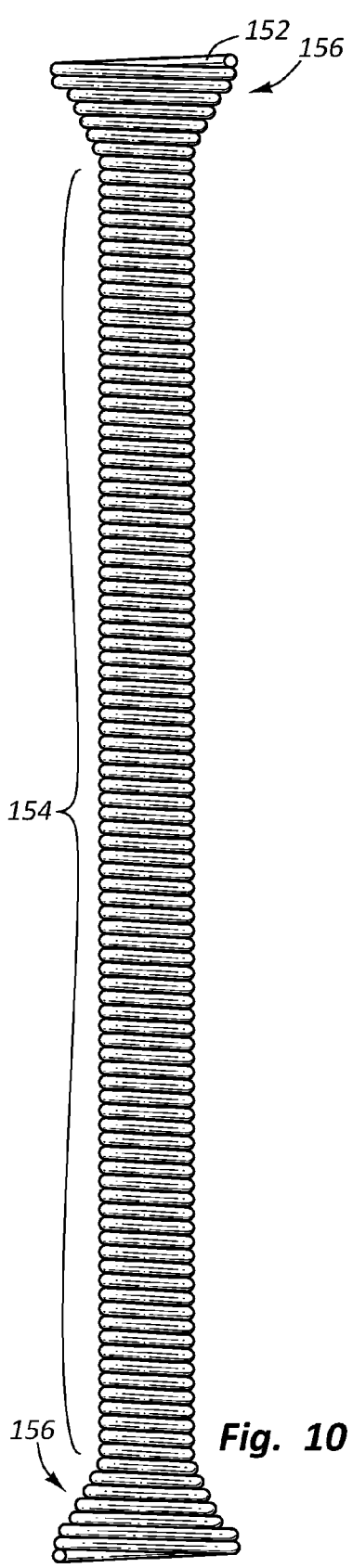
FIG. 10 is a rear view of the exercise coil spring of FIG. 7.
Figure 11:
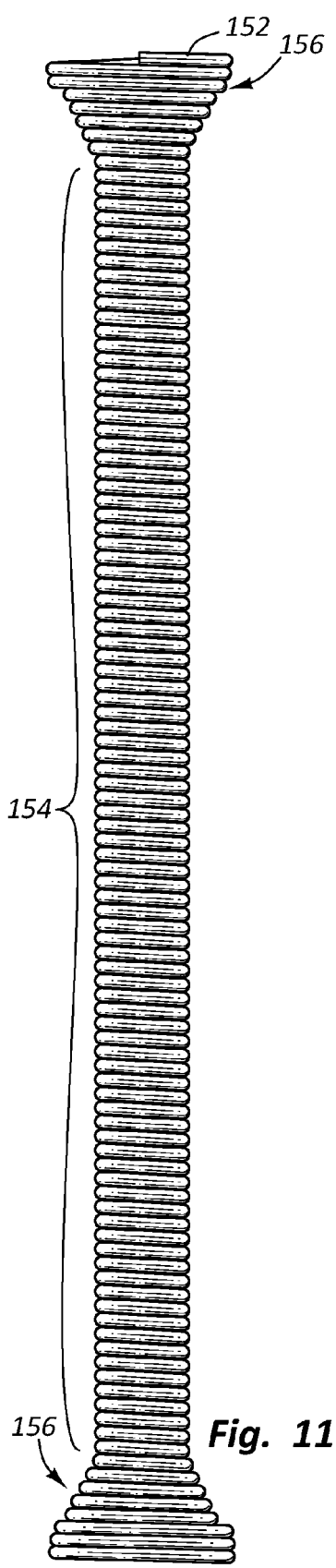
FIG. 11 is a first side view of the exercise coil spring of FIG. 7.
Figure 12:
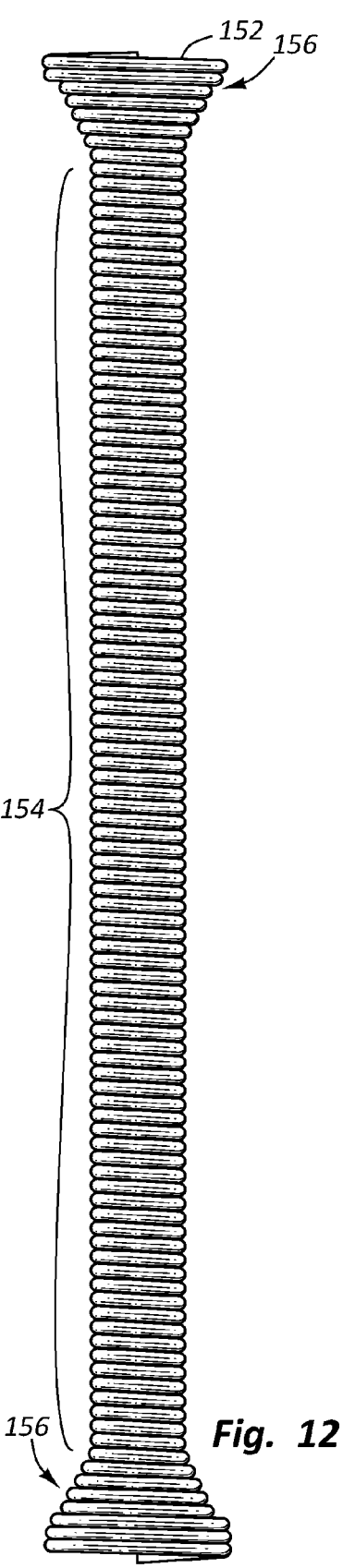
FIG. 12 is an opposite side view of the exercise coil spring of FIG. 7.
Figure 16A:
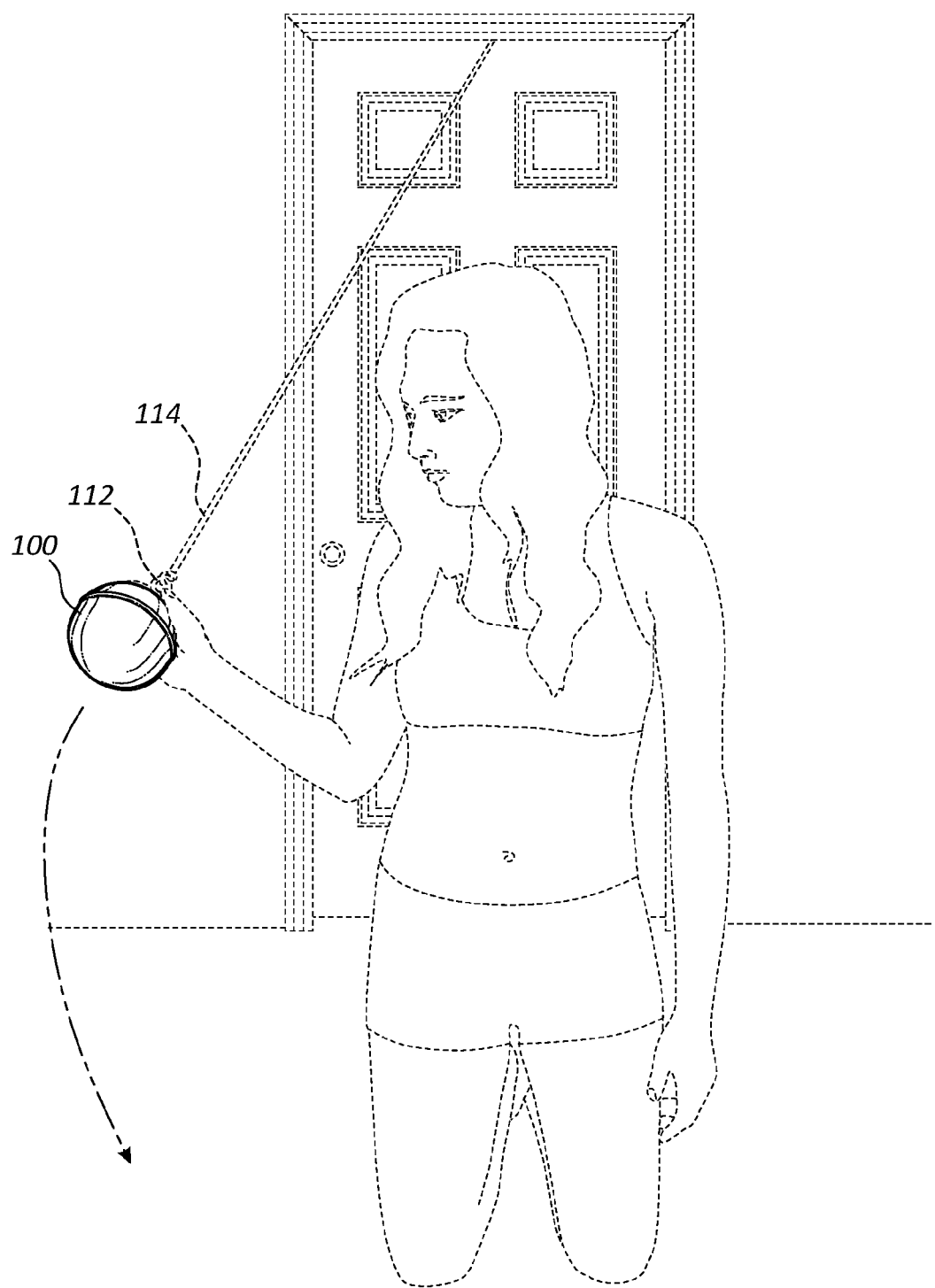
FIG. 16A shows a user using the wobbly ball of FIG. 1 in another exemplary exercise.
Figure 16B:
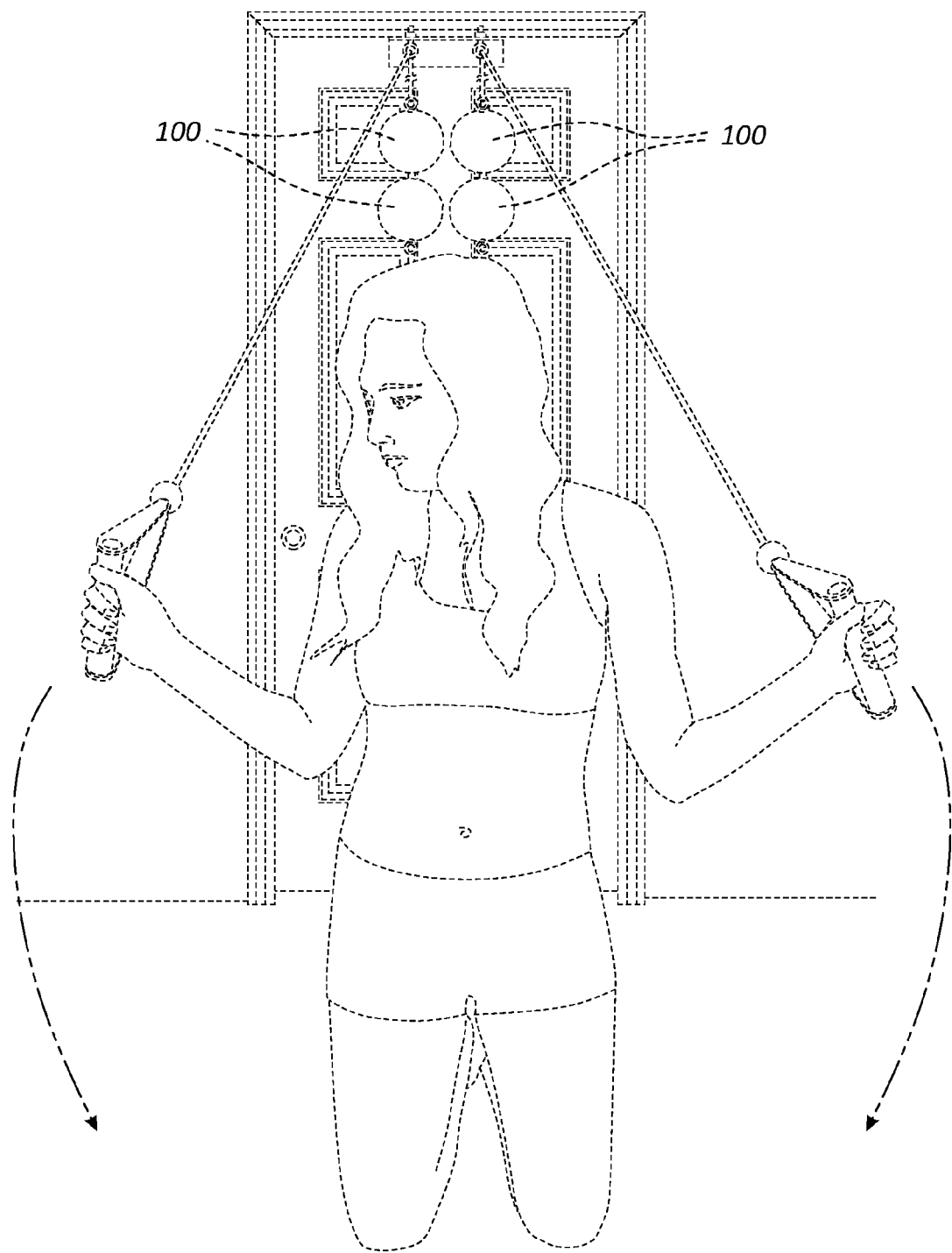
FIG. 16B shows a user using a plurality of the wobbly balls of FIG. 1 in another exemplary exercise.
Figure 17:
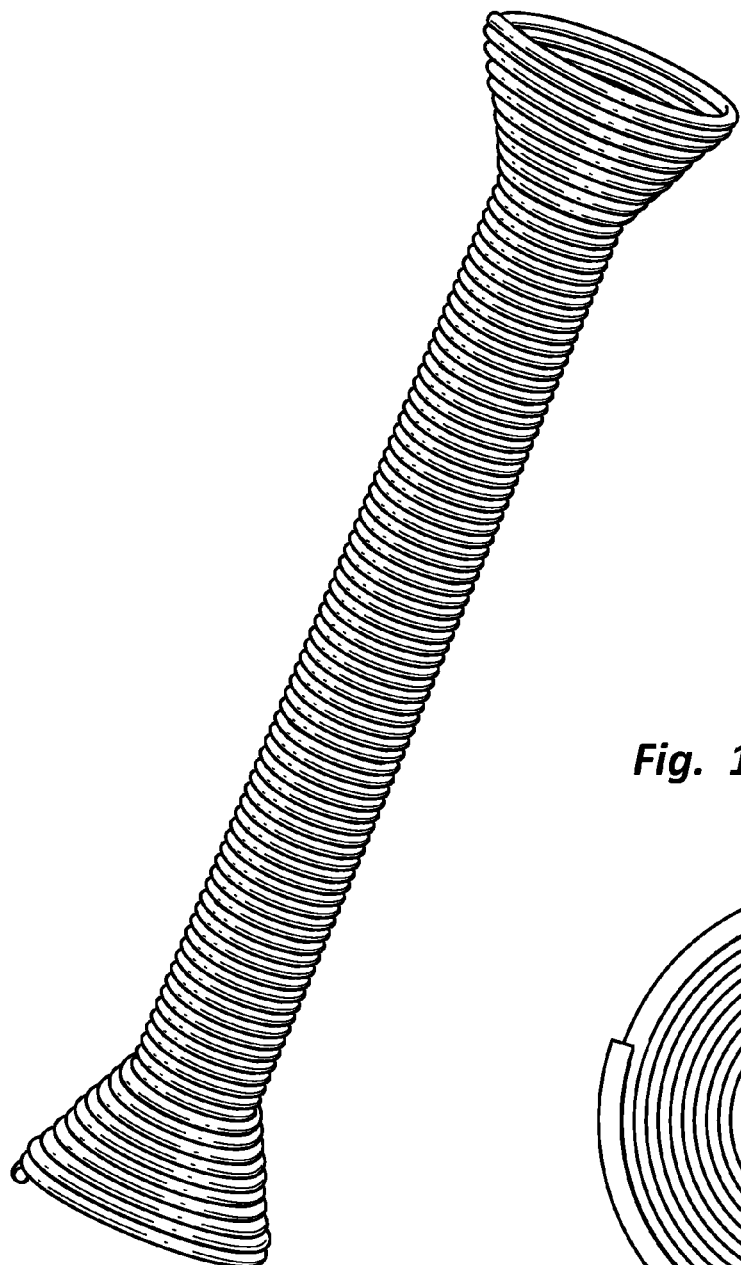
FIG. 17 is a perspective view of another exemplary exercise coil spring according to another embodiment of the present invention.
Figure 18:
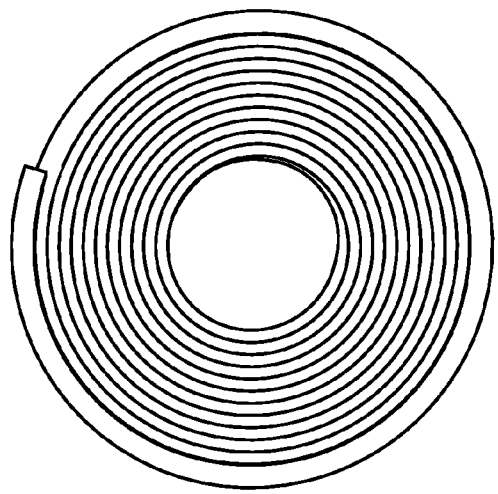
FIG. 18 is an end view of the exercise coil spring of FIG. 17, the opposite end view being identical.
Figure 21:
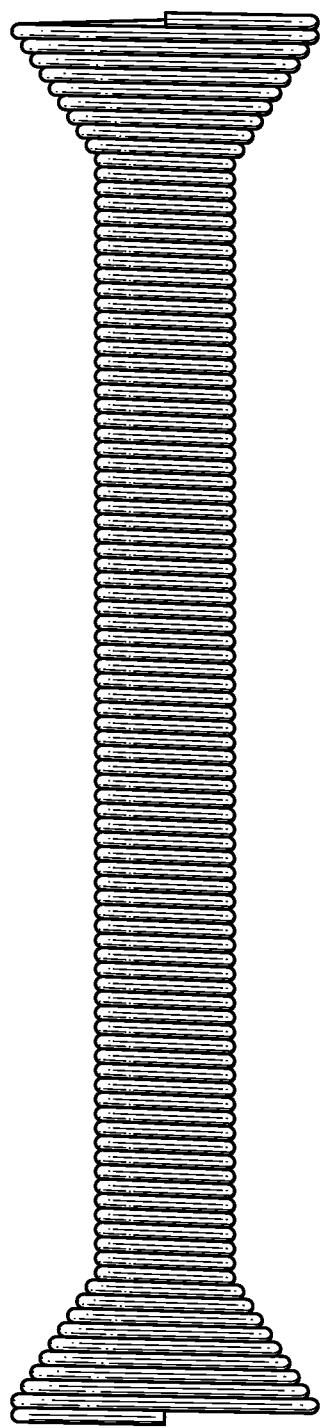
FIG. 21 is a first side view of the exercise coil spring of FIG. 17.
Figure 22:
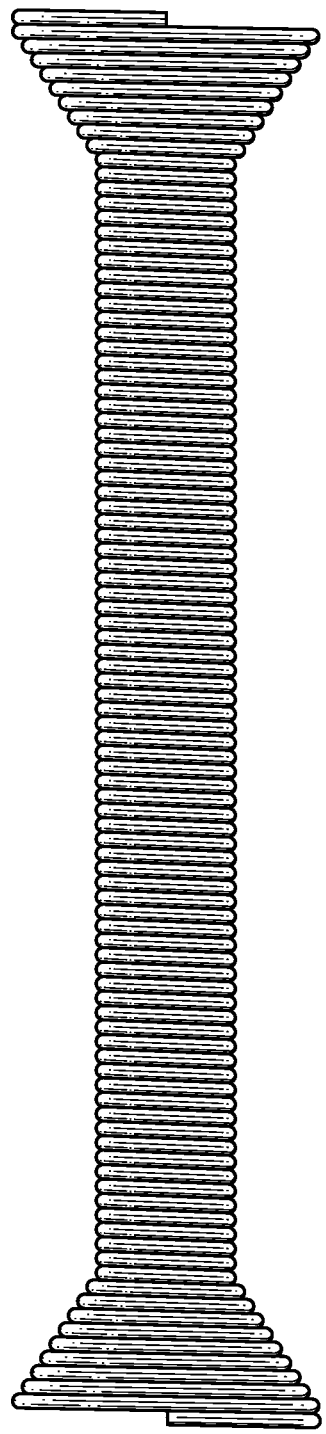
FIG. 22 is an opposite side view of the exercise coil spring of FIG. 17.

As shown in FIG. 6, a bolt 110 including an eyelet 112 may be attached at a top end of the wobbly ball 100, allowing the wobbly ball 100 to be attached to a bungee 114, or other elastomeric cord, string, rope, etc., as seen in FIG. 16A. For example, one end of the bungee 114 may be attached to a door or other anchoring structure, as shown, with the other end of bungee 114 attached to eyelet 112 of wobbly ball 100. An exercise user as shown may grasp wobbly ball 100 in the palm of a hand, and stretch bungee 114, as an exercise, as shown. FIG. 16B shows another exemplary exercise, where bungees may be attached one end to a handle grasped in the user's hands, the other end being threaded through an eyelet of a bracket placed over the top of a door. The bracket may include an overhanging or cantilevered portion so that the bungee, cable, etc. is spaced apart from the vertical door face. After passing through the eyelet, the end of the bungee (opposite the handle) may be attached to an eyelet of a wobbly ball 100. In an embodiment, each wobbly ball may include two eyelets—one at each end, opposite the other (e.g., a second eyelet 180° apart from eyelet 112 seen in FIG. 6 so as to position an eyelet at each "pole" of wobbly ball 100). Using s-hooks or any other suitable connector, adjacent wobbly balls may be attached to one another, in a chain, one above the other, serving as resistance weights as the handle ends of each bungee is pulled.

Figure 13:
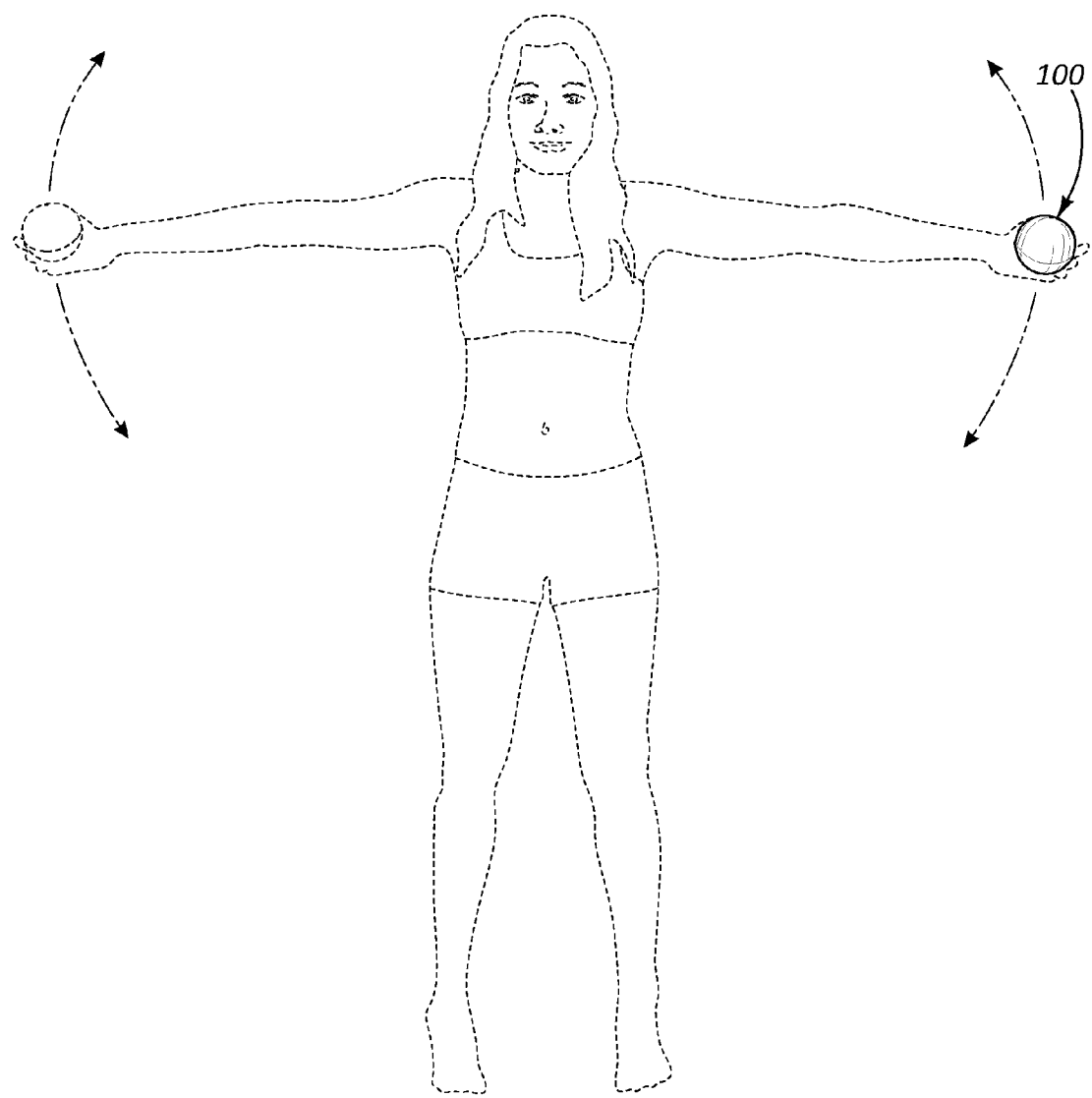
FIG. 13 shows a user using the wobbly ball of FIG. 1 in an exemplary exercise.

FIG. 13 illustrates how an exercise user may alternatively hold a wobbly ball in a palm of each hand (or just one hand), and move the wobbly ball in various directions, so as to cause the inner ball 104 to roll within cavity 106, generating eccentric motion and forces of the wobbly ball 100. As the exercise user works to maintain control of the wobbly ball, many muscle groups (e.g., in the hands, arms, chest, shoulders, back, etc.) are exercised to counteract the eccentric, wobbly motion of the wobbly ball 100. Myriad other exercises are of course also possible.

As seen in FIG. 1, the top of wobbly ball 100 may include a hole 116 through body 102, through which such a bolt 110 may be threaded or otherwise attached.

II. Exemplary Exercise Coil Springs

FIGS. 7-12 illustrate an exemplary exercise coil spring 150 according to an embodiment of the present invention. Exercise coil spring 150 may be formed of a single coiled wire 152 (e.g., music wire or piano wire). Coil spring 150 includes a central portion 154 where the coiled wire 152 is coiled to a first diameter that is constant throughout the central portion 154. Coil spring 150 also includes opposed flared ends 156 on either side of central portion 154 where the coiled wire 152 is progressively coiled from the first diameter to a second diameter that is larger than the first diameter.

For example, in an embodiment, the first diameter of central portion 154 may be about ⅝ of an inch (about 16 mm), while the flared ends 156 may have a maximum width at their ends that is about double that of the central portion (e.g., about 1.25 inch) (about 32 mm). Another embodiment may include a larger diametered central portion, providing increased stiffness and resistance to the spring during exercise use. For example, the central portion 154 may be about 1 inch (about 25 mm) in diameter, while the flared ends 156 may have a maximum width at their ends that is about double that of the central portion 154 (e.g., about 2 inches). In an embodiment, the diameter of the flared ends at its maximum may be 150% to 300%, or about 200% that of the central portion. The full length of the exercise coiled spring may be about 9-10 inches. The number of transition coils of the flared ends 156 may be about 7-8 coils from the end of the central portion 154 to the end of the flared end. The diameter of the wire from which the spring is coiled may be about 0.1 inch. In an embodiment, the coil spring may be free, unattached from any other structure, e.g., the exercise device may consist of the coil spring, which may consist of the single coiled wire with the central portion and flared opposed ends as described and shown in FIGS. 7-12. FIGS. 17-22 illustrate an exemplary spring of the larger size (e.g., where the larger diametered central portion may be about 1 inch to 1.25 inch in diameter. The flared ends may similarly be double the dimension of the ⅝ inch spring. The overall height of the two springs (FIG. 7 and FIG. 17) may be substantially identical (e.g., 9-10 inches).

Figure 14A:
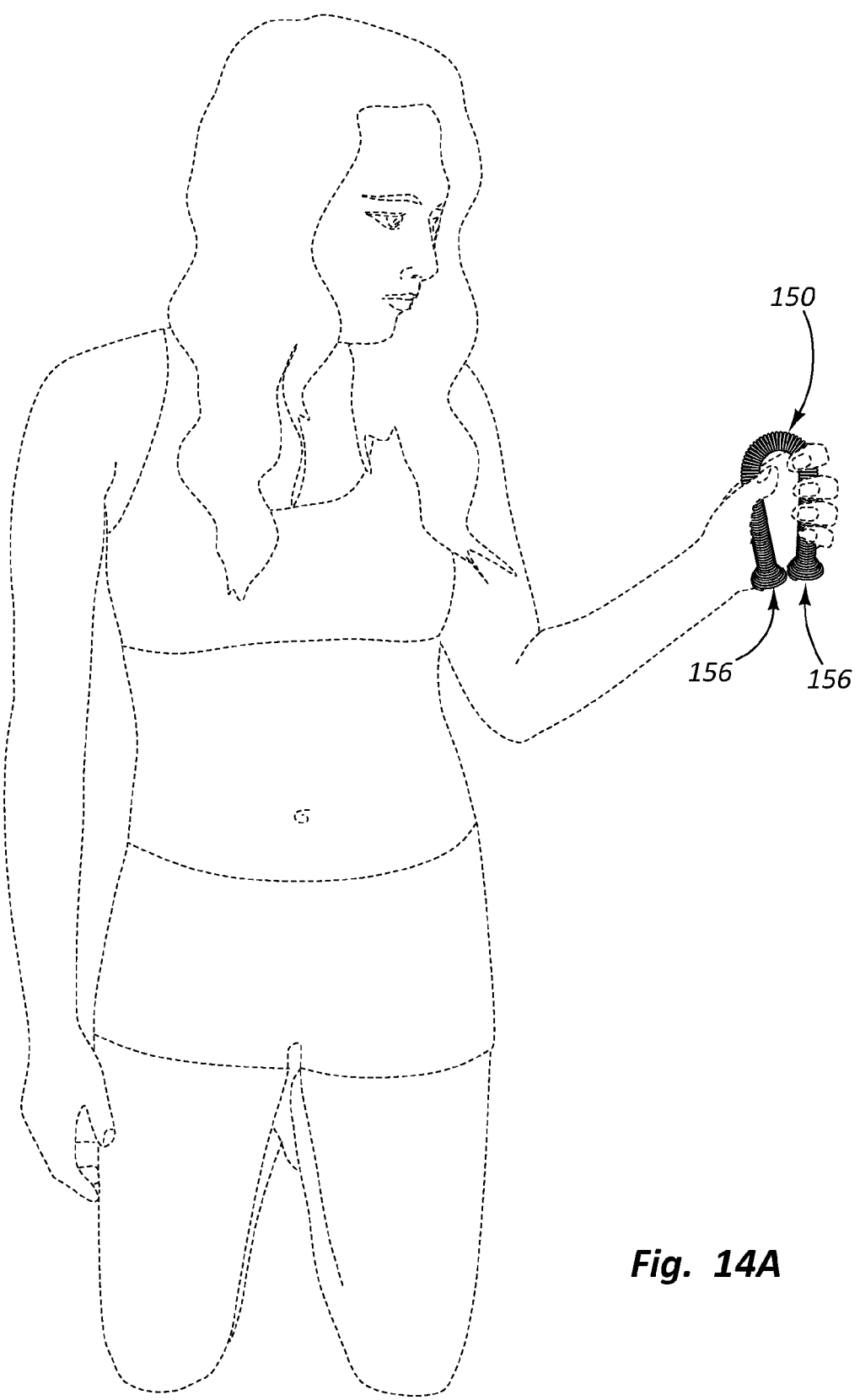
FIG. 14A shows a user using the exercise coil spring of FIG. 7 in an exemplary exercise.

Such a coil spring may be used in various exercises by an exercise user. FIG. 14A shows one exemplary exercise, where the exercise user may grasp both ends of the spring in a single hand, bending the central portion into a U-shape, and flexing the fingers and muscles of the hand around the U-shaped coil spring 150 as the spring provides resistance to such U-shape bending. The opposed flared ends 156 of coil spring 150 serve as flared handles to aid in retaining the exercise coil spring 150 in the hand, preventing it from sliding out of the hand. Such an exercise may replace that achieved using a hand grip squeezer exercise device, which are really only useful for a single exercise. Thus, the exercise coil spring may replace many exercise devices, as it is quite versatile.

Figure 14B:
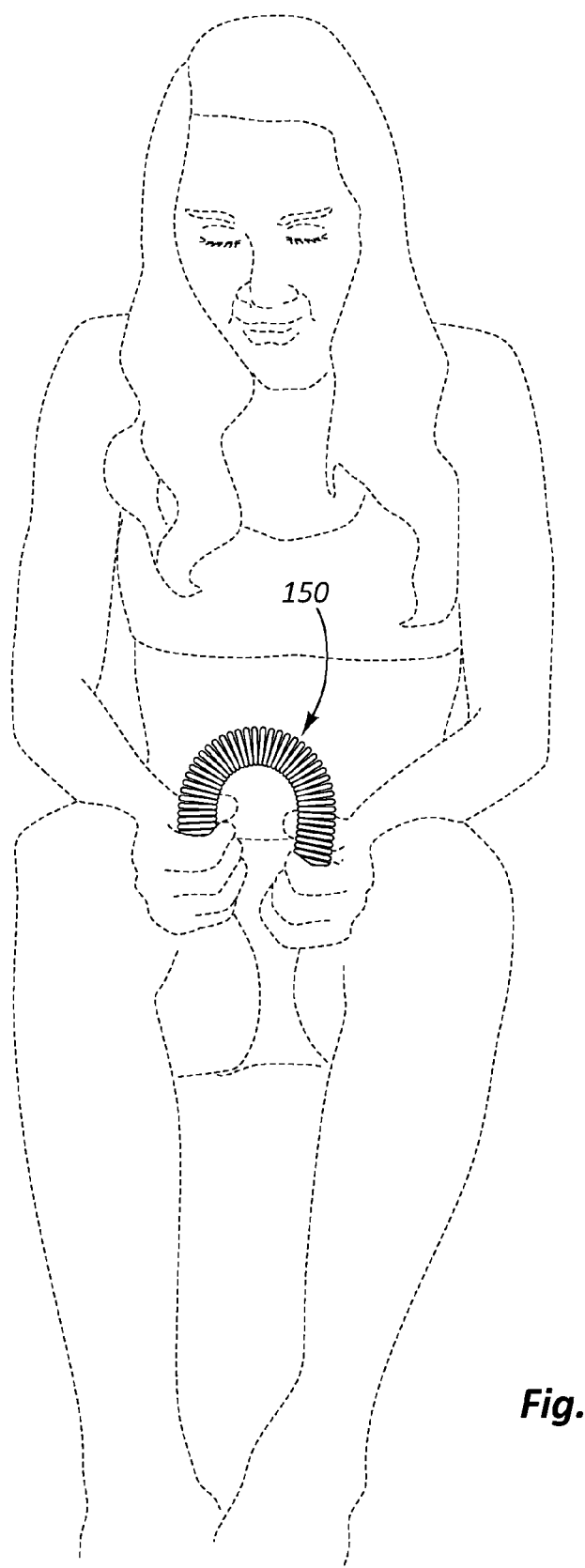
FIG. 14B shows a user using the exercise coil spring of FIG. 7 in another exemplary exercise.

For example, myriad other exercises may be performed with the spring, such as pulling on the opposed flared ends with opposite hands to stretch the spring longitudinally, the spring may be placed between the thighs and bent to a U-shape (similar to the motion and exercise provided by a THIGHMASTER—see FIG. 14B), one flared end of the coil spring may be held in one hand, while the other flared end is placed under the chin and the chin rotated up and down to bend the coil spring towards the U-shaped configuration, etc. The exercise coil spring may be inserted over a rope, allowing springs at opposite ends of the rope to be used as jumprope handles.

Figure 15:
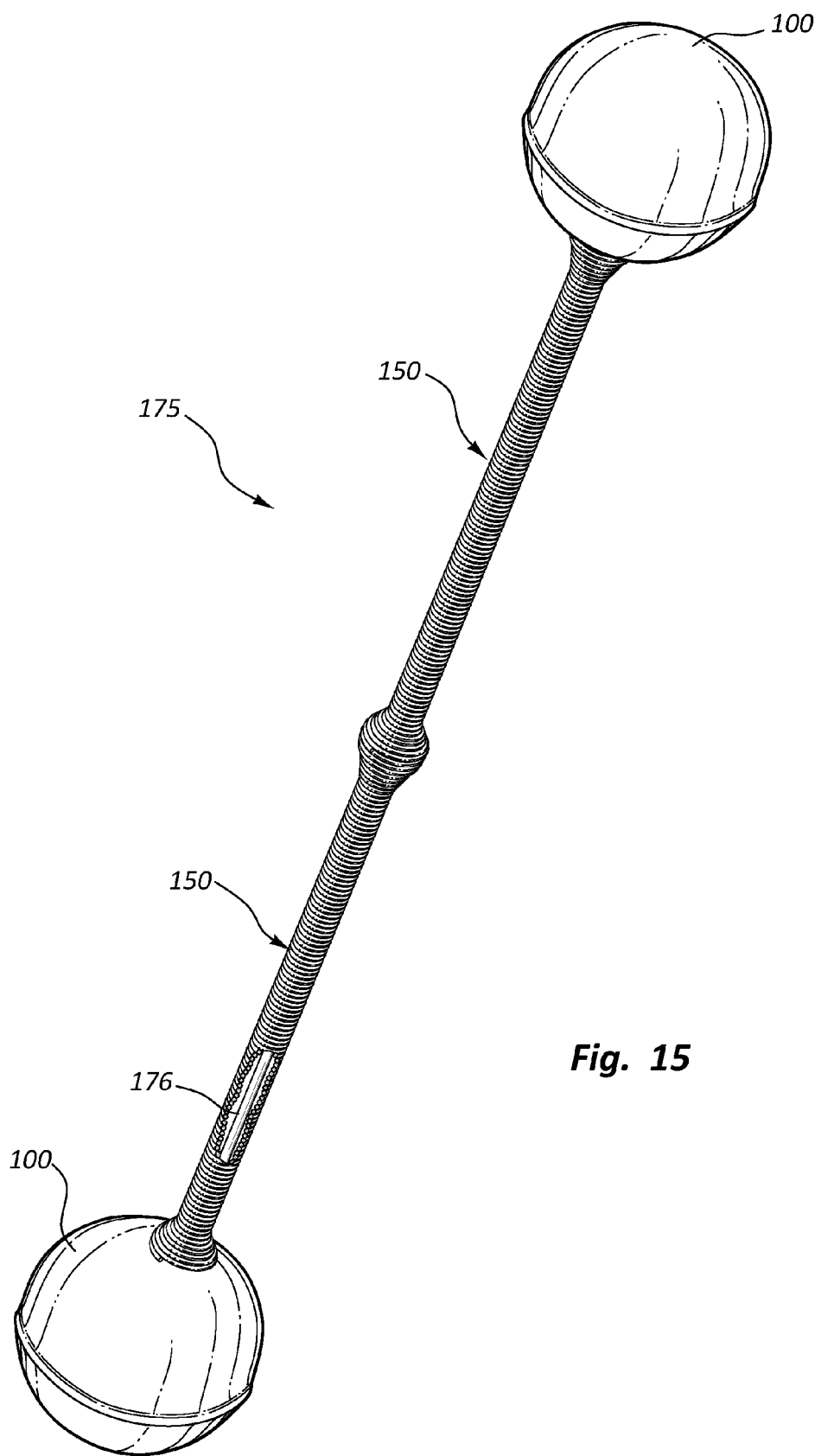
FIG. 15 shows an exemplary assembly including two wobbly balls and one or more exercise coil springs.

Another assembly may include both the exercise coil spring(s) and the wobbly ball(s), as shown in FIG. 15. Such an assembly 175 may include a plurality (e.g., two) wobbly balls 100, and one or more exercise coil springs 150, joined together by a rod 176 extending through coils springs 150. Rod 176 may be attached to each wobbly ball 100 through hole 116 (e.g., and an associated bolt 110—see FIG. 6). The bolt 110 may be attached to rod 176, or the end of rod may simply be the bolt 110 that attaches to each wobbly ball 100 through hole 116. Such an assembly may resemble a barbell, although because of the wobbly balls 100 on either end of assembly 175, it may provide the above described wobbly, eccentric motion and forces as the assembly 175 is lifted like a barbell. Rigid rod 176 may prevent any bending of coil springs 150 towards their U-shaped configuration. In another embodiment, where rod 176 were flexible, the springs could be so bent, bending one wobbly ball 100 towards the other (e.g., effectively causing the coil springs 150 placed end to end to act as a single longer coil spring).

Figure 23:
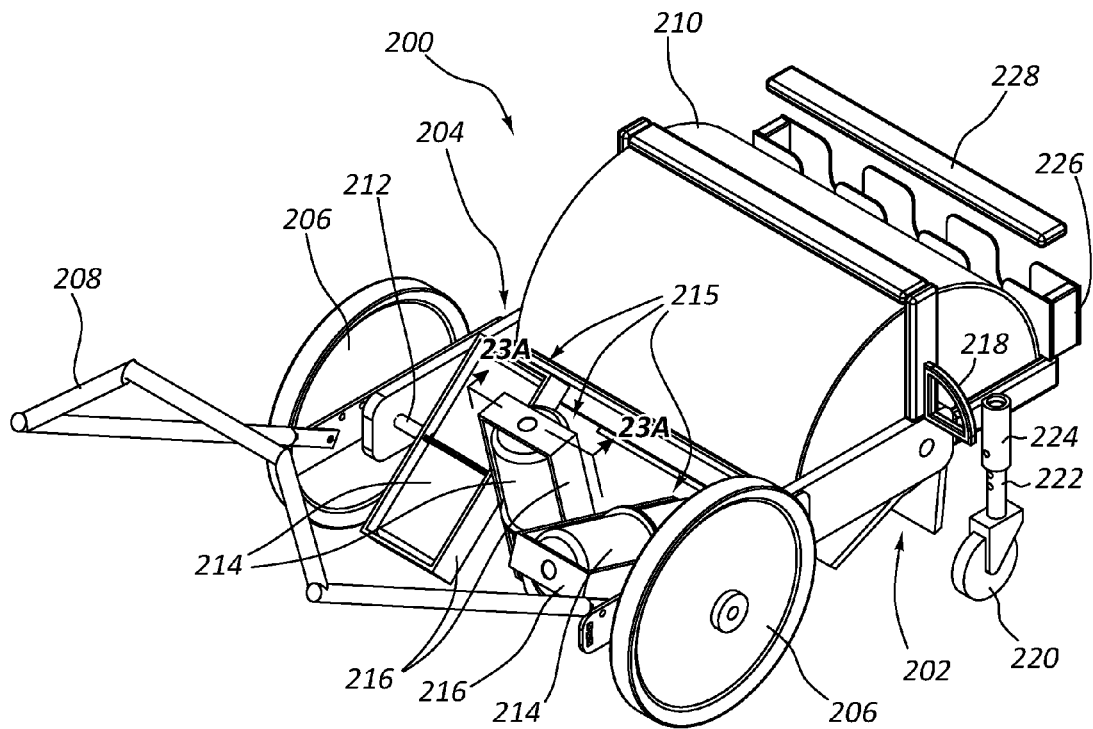
FIG. 23 is a perspective view of an exemplary device that may be configured as a lawn aerator, power rake, lawn mower, or lawn roller, including one or more wobbly ball engines.

In another embodiment, the wobbly balls may be used to power or at least augment the efficacy of a lawn aerator, a power rake, a tiller, a lawn roller, a lawn mower, a boat (e.g., a paddle boat), or other vehicle. FIGS. 23-26 illustrate various views of an exemplary push model aerator, power rake, tiller, mower, or lawn roller. FIG. 23 shows a perspective view, FIG. 24 a rear view, FIG. 25 a side view, and FIG. 26 a top view. A single device 200 such as that illustrated may accommodate use as an aerator, power rake, tiller, lawn roller, and lawn mower, by simply replacing the rack structure 202 with the appropriate rack or active head.

Figure 27A:
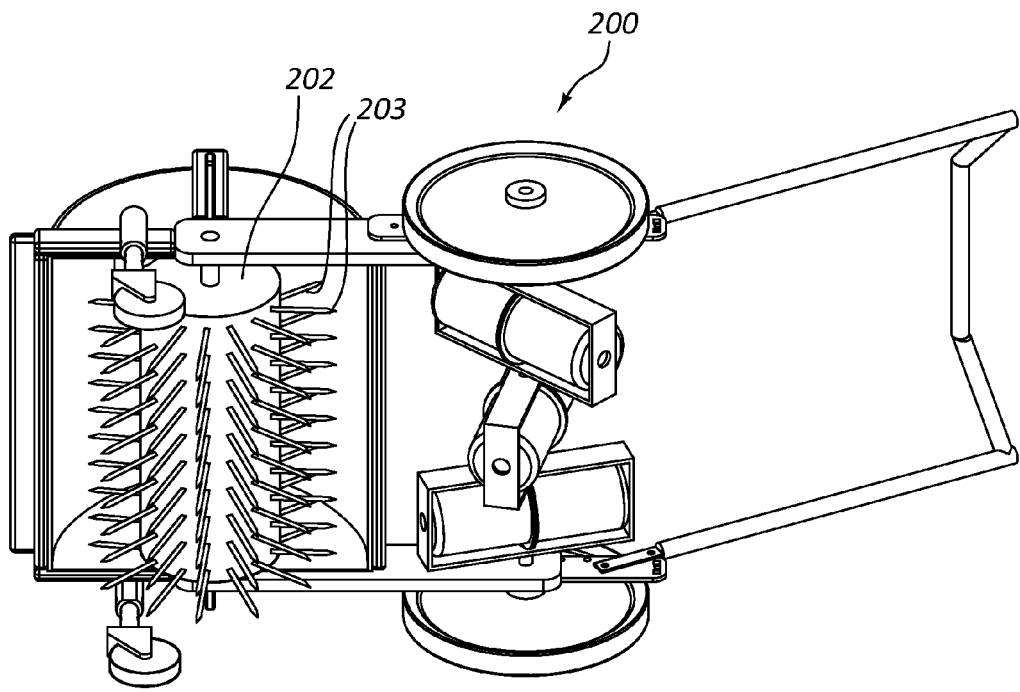
FIGS. 27A-27E illustrates various interchangeable racks or active heads that may be installed into the device of FIGS. 23-26.

For example, the aerator may include a rack structure that includes a plurality of tines (as in a standard aerator that one of skill in the art will be familiar with) (e.g., mounted to a cylinder) which rotates. As the rack of tines rotates, the tines 203 are pressed into the lawn, removing plugs of soil, as will be appreciated by those of skill in the art. FIG. 27A illustrates such an interchangeable rack 202.

Figure 27B:
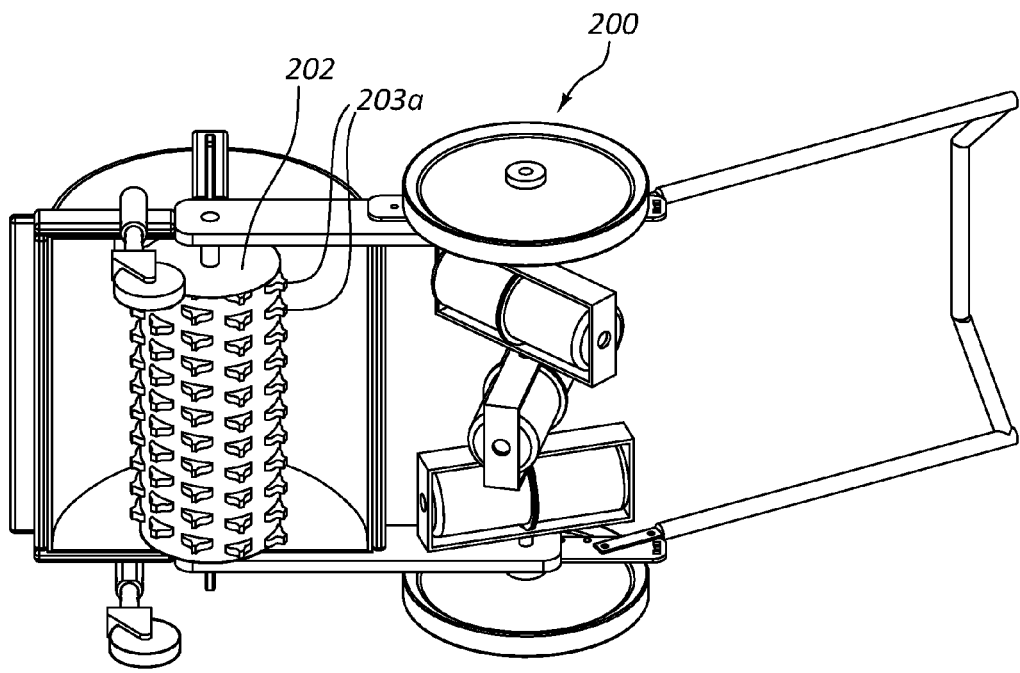

The rack structure 202 for a power rake may be similarly configured, including a cylindrical member which rotates, while the cylinder may include a plurality of raking protrusions 203a that extend laterally (e.g., radially) relative to the cylinder. Such protrusions may not be hollow as the aerator tines 203, and serve to rake material as the cylinder rotates over the surface. FIG. 27B illustrates such an interchangeable rack 202.

Figure 27C:
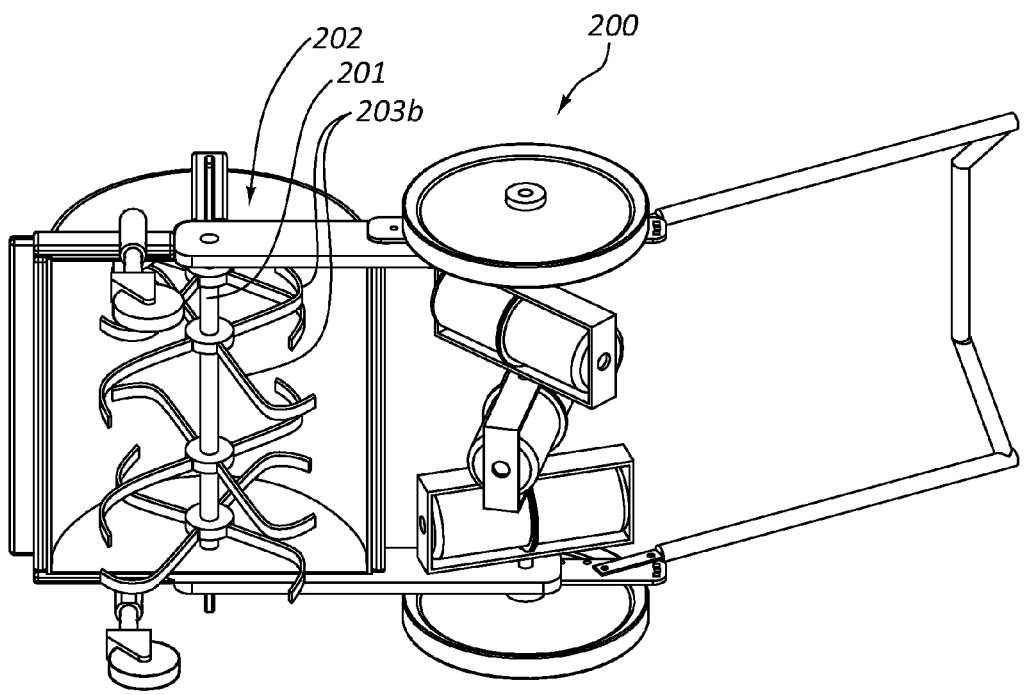

A rototiller may include a rack including tiller blades spaced apart from one another, as will be apparent to one of skill in the art. Such tiller blades 203b may be mounted onto a cylindrical shaft 201 which rotates, causing the tiller blades to cut into the soil. FIG. 27C illustrates such an interchangeable rack 202.

Figure 27D:
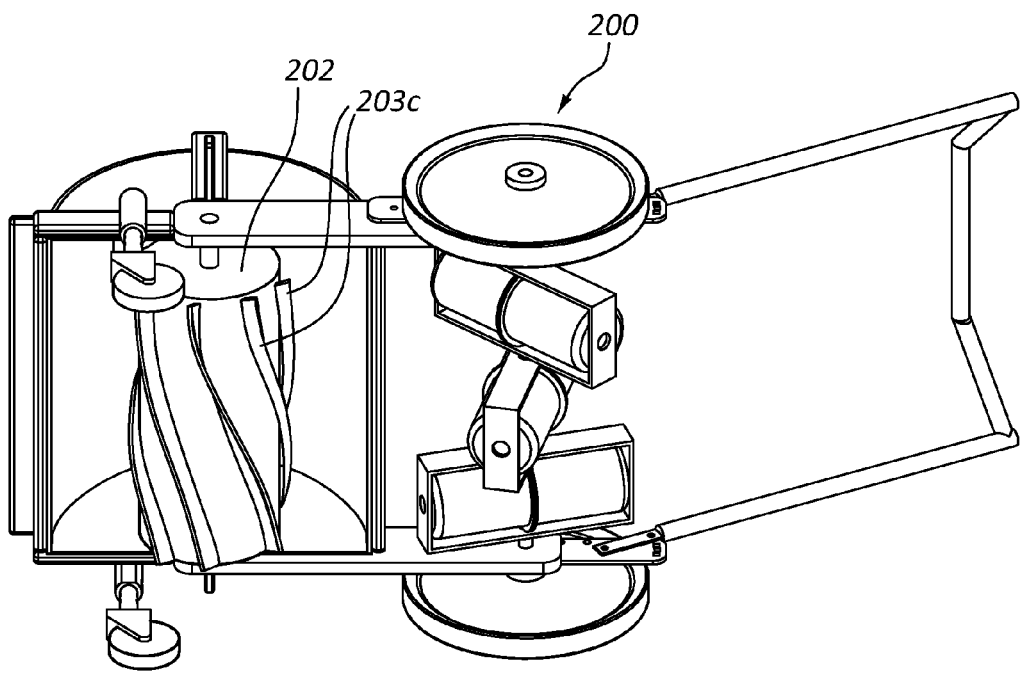

A mower rack 202 may replace the other rack structure for use as a lawn mower. The mower blade(s) may be configured so as to rotate in a plane above the lawn surface, as a typical push mower operates, or may be configured as the older style manual mowers (a reel mower) where the blades 203c are arranged in a generally cylindrical shape, rotating over the lawn (i.e., so that the longitudinal axis of the cylinder remains a given height above the lawn as the mower is pushed over the lawn's surface). FIG. 27D illustrates such an interchangeable rack 202 with a reel mower with blades 203c.

Figure 27E:
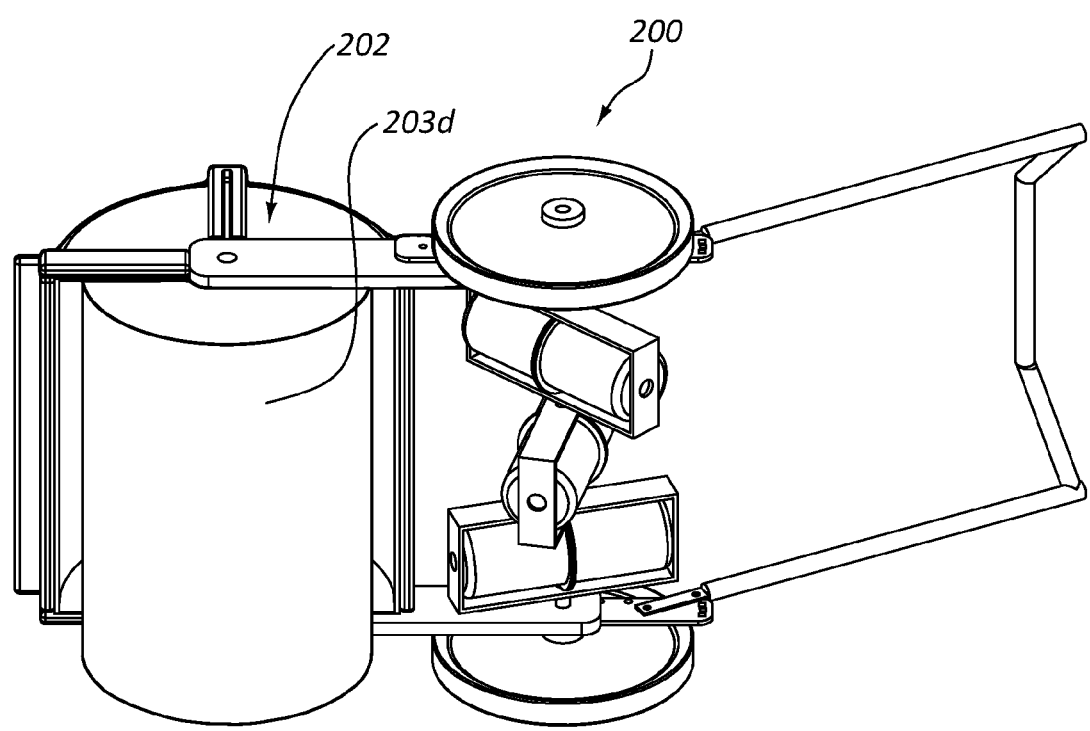

A lawn roller head 202 may include a plastic, metal or other cylinder 203d that can be filled with water, and an inlet through which the cylinder 203d may be filled. A plug or cap (e.g., a stopcock) may be provided to selectively seal the inlet once filled. FIG. 27E illustrates such an interchangeable rack 202 configured as a lawn roller. Another active head could be configured as a snowblower. It will be apparent to those of skill in the art that other active interchangeable heads could also be provided.

As shown, device 200, including any of the rack structures 202 may be employed (e.g., the various rack structures 202 may be interchangeable with one another, so that device 200 may be used as any of the above described specific devices). Device 200 may generally include a frame 204, a pair of opposed wheels 206, one of the various above described racks 202 configured to aerate, rake, till, mow, or roll, and a push handle 208 (e.g., at the rear of device 200). Handle 208 may be configured to be rotatable over the front end of device 200, for compact storage. As such, the device may be stowed within a trunk of a car, back of a truck, or trailer. The device may be so small when the handle is rotated over the front of device 200 so as to easily fit within a trunk of a typical car, not requiring a truck bed or trailer. To aid in picking up device 200, a pair of handles 218 may be provided on opposed sides of frame 204 (e.g., on either side of shield 210. In addition to rear wheels 206, front wheels 220 may also be provided. Such wheels may be height adjustable, e.g., through locking vertical shaft 222 into a desired location relative to cylinder 224 (e.g., with a locking pin). A weight tray 226 may also be provided, e.g., at or near a front of device 200, which can be filled with one or more weights 228, so as to weigh down the device in the region of active head 202, so as to press it further into the ground as it aerates, tills, rakes, etc.

Figure 23A:
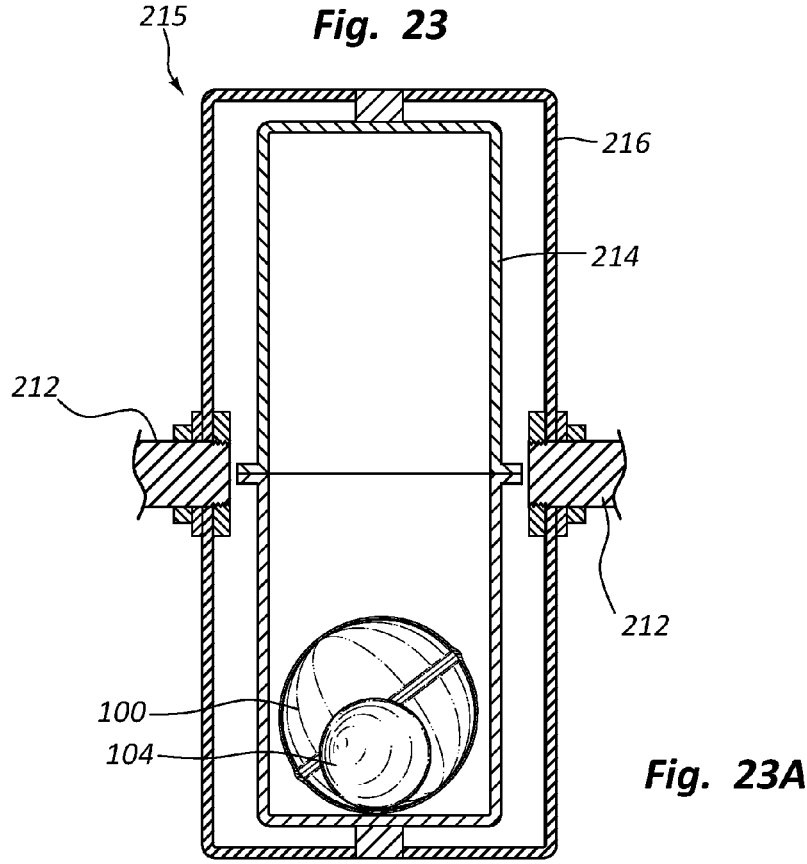
FIG. 23A shows a close up of an exemplary wobbly ball engine on an axle.
Figure 24:
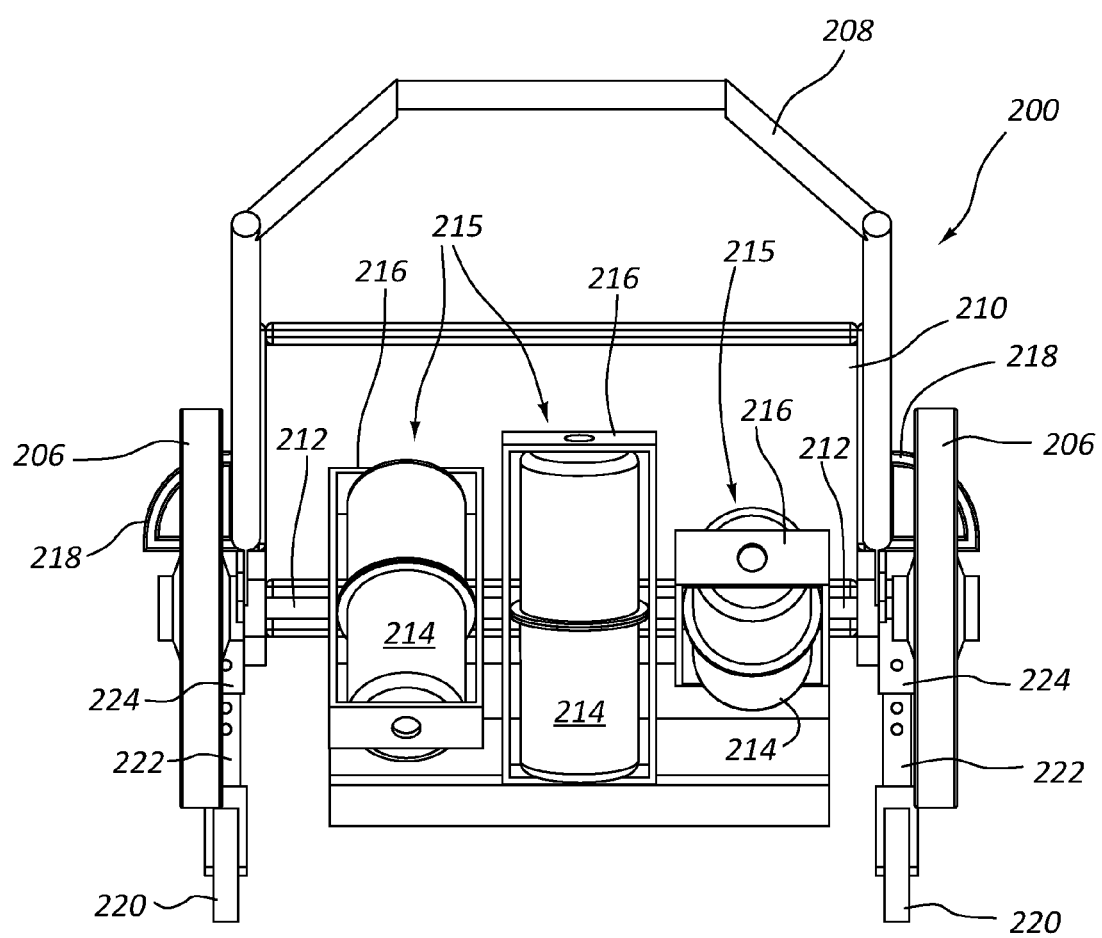
FIGS. 24-26 illustrate additional various views of the device of FIG. 23.
Figure 25:
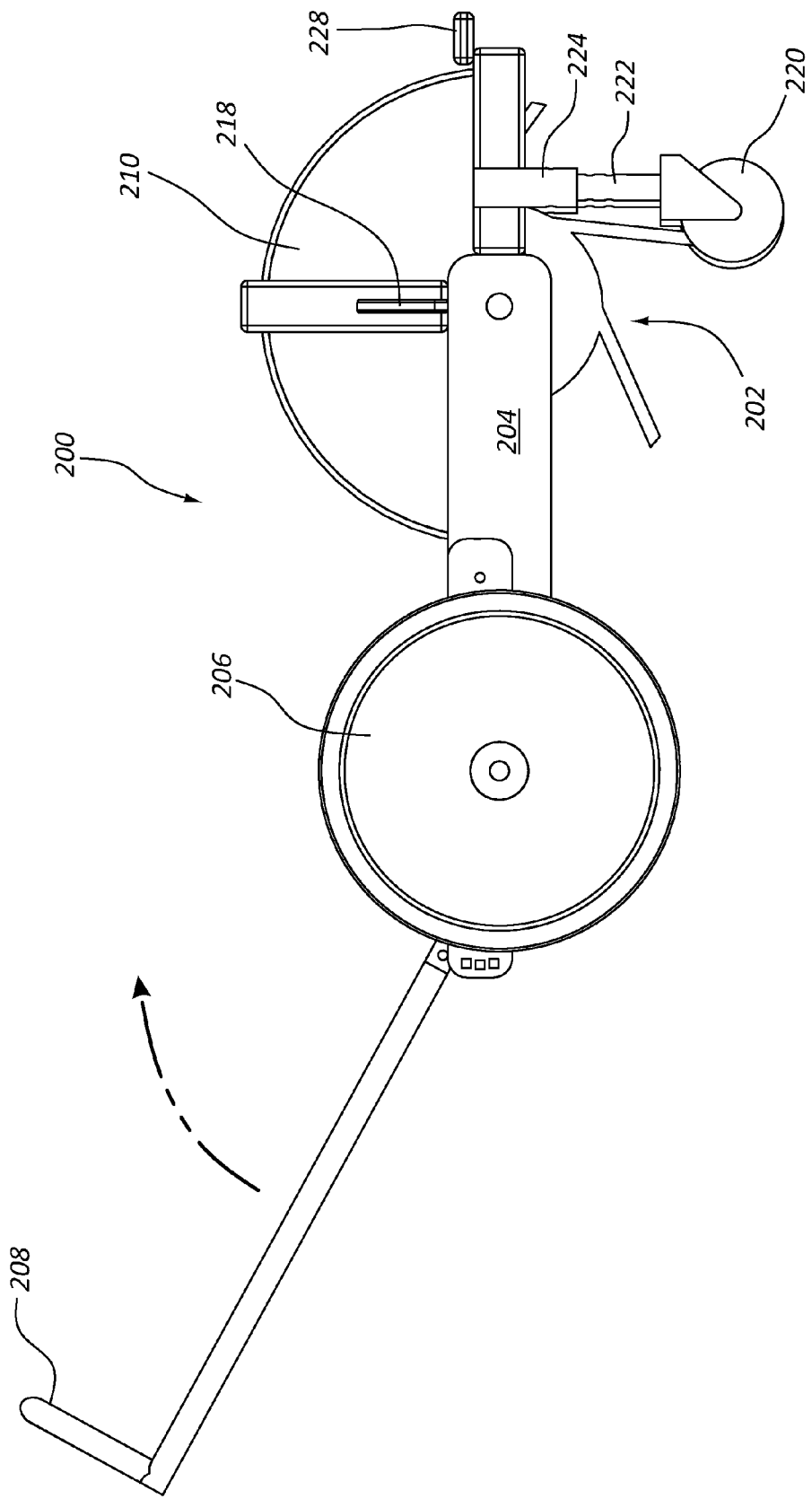
Figure 26:
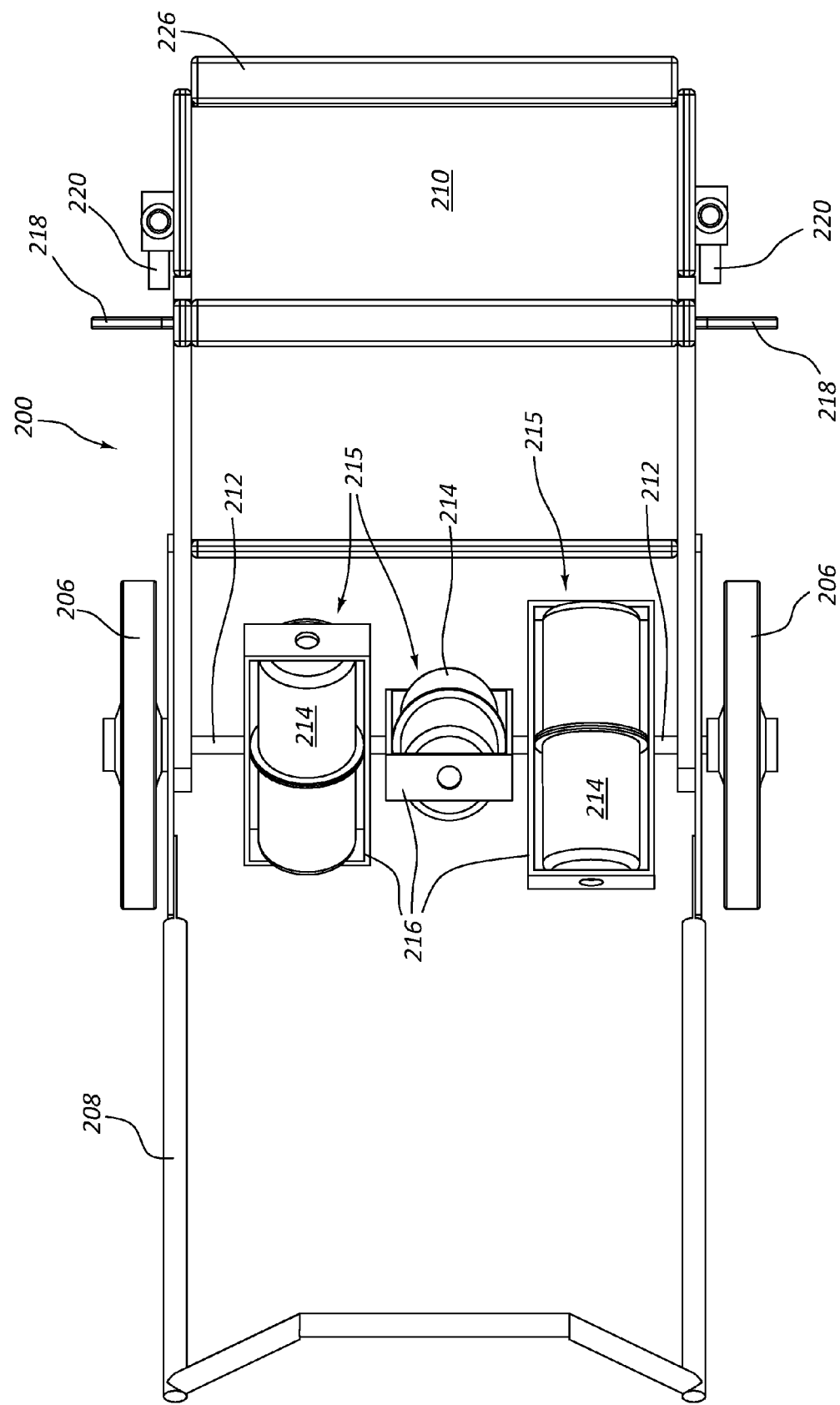

A shield or cover 210 may be provided to cover at least the top portion of installed rack 202, for increased safety. As shown, a plurality of canisters 214 (e.g., cylindrical in shape) may be mounted to the same axle 212 as wheels 206 (e.g., between wheels 206). Canisters 214 may be mounted to a bracket 216, which in turn may be mounted to axle 212 (e.g., using bolts, nuts, and/or a weld, etc.). Each canister 214 may be hollow, and may include a wobbly ball 100 housed therein, as shown in FIG. 23A, forming one or more wobbly ball engines 215. Canisters 214 and/or brackets 216 may be fixed relative to axle 212, rather than freely rotatable thereabout, so as to rotate with axle 212. Brackets 216 and canisters 214 may be fixed relative to one another. In any case, canisters 214 rotate as axle 212 rotates. Because a wobbly ball 100 is disposed therein, which is free to move therein, as the canister 214 rotates, wobbly ball 100 under influence of gravity will roll or fall from one end of the canister to the other, as the axle 212 rotates, generating an alternating pounding force in the canisters and on device 200. Some of this generated force will be transferred to installed rack 202, augmenting the effectiveness of the aeration, raking, tiller, mowing, or rolling. Because of the eccentricity of the wobbly ball 100 (i.e., it is not perfectly spherical), and its captured inner ball 104, there may be a substantial amount of residual eccentric, random movement and vibration, even after wobbly ball 100 falls to the bottom of canister 214. Because of the continued rotation of axle 212 and this eccentric, unpredictable movement, the wobbly balls 100 within canisters 214 will constantly be moving and vibrating during use of device 200.

In an embodiment, as shown, three wobbly engines 215 (i.e., wobblies 100 trapped in cylinders 214) may be installed. The orientation of the wobbly engine cylinders 214 may differ from one another, relative to their relative rotation of the respective cylinder 214 about axle 212. For example, as shown, a cylinder adjacent a given wheel 206 may be oriented in a given relationship, the next cylinder 214 (e.g., the middle cylinder) may be rotated about 60° (e.g., about 30° to about 90°) relative to the referenced cylinder 214 adjacent wheel 206, and the next cylinder 214 (e.g., adjacent the other wheel 206) may be rotated another about 60° (e.g., about 30° to about 90°) relative to the middle cylinder 214. Such an arrangement may provide approximately equal distribution of the orientation of the cylinders, so that as axle 212 rotates, the rolling of the wobbly balls 100 in cylinder 214 is evenly distributed about the full rotational cycle of the axle 212. For example, an end of a cylinder 214 may be oriented vertically downward about every 60° (e.g., there are 6 ends, divided over 360° of rotation gives 60° separation between each successive downwardly oriented end of cylinder 214).

Where more or fewer wobbly engines are installed, the distribution may be adjusted so as to remain even (e.g., about every 45° for 4 engines, about every 90° for 2 engines, etc.). In another embodiment, two or more cylinders may be oriented so as to be aligned, so that their wobbly balls fall together, simultaneously. For example, an embodiment including 4 engines may include two pairs, with each engine of a given pair being aligned with one another (e.g., 2 balls falling together each 90°). In an embodiment, more than a single wobbly ball may be encased within each cylinder (e.g., a cylinder could include 2 or 3 wobbly balls disposed therein, if desired). Such embodiments may be particularly suited for pairing with a longer canister 214, to accommodate the space occupied by the additional wobbly balls, while still providing falling space. For example, the falling space or length not occupied by wobbly balls 100 in an embodiment may be at least equal to the width of one ball, or at least double the width of one ball. For example, the free falling space or length available may be from about 1.5 to about 2.5 ball widths in length.

Figure 28A:
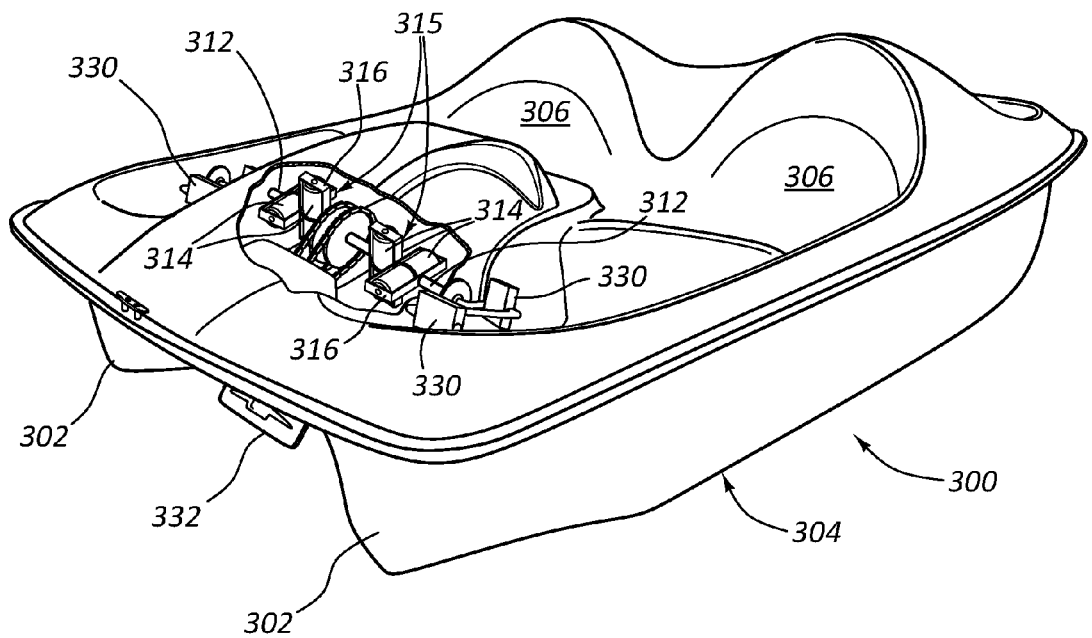
FIGS. 28A-28B illustrate various views of an exemplary catamaran or paddle boat that may include one or more wobbly ball engines installed on the shaft or axle to which the pedals and paddle wheel(s) are connected, providing augmented power to the paddle wheel as the pedals are pedaled.
Figure 28B:
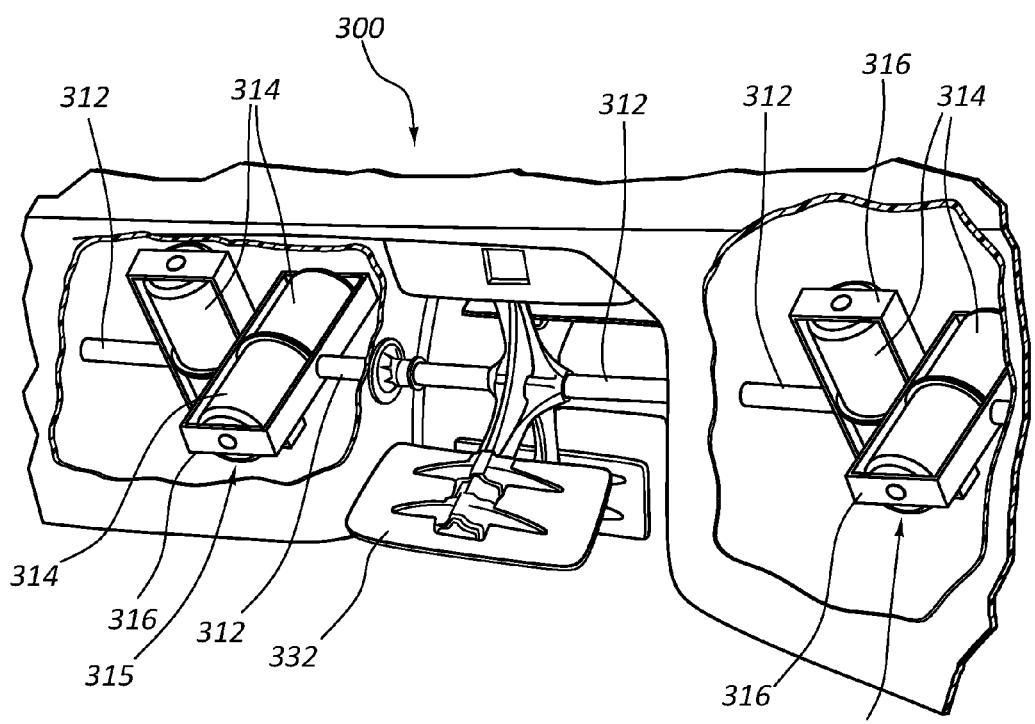

FIGS. 28A-28B illustrate various views of an exemplary paddle boat 300 (e.g., configured as a catamaran with twin hulls 302) that may include one or more wobbly ball engines 215 installed on the shaft or axle 312 to which the pedals 330 and paddle wheel(s) 332 are connected, providing augmented power to the paddle wheel 332 as the pedals 330 are pedaled. Boat 300 may include a frame 304 with twins hulls 302. One or two seats 306 may be provided, with foot pedals 330 (e.g., for each seated user). Pedals 330 may be operably connected to a paddle wheel 332 that may be mounted to a shaft 312. One or more wobbly engines 315, including a wobbly ball 100 encased within a cylinder 314, similar to the configuration described above in conjunction with FIGS. 23-27E, may be provided. As above, wobbly ball engines 315 may be mounted on shaft 312 (e.g., using brackets 316), so as to rotate with shaft 312, augmenting power delivered through pedals to paddle wheel 310. For example, such a configuration may provide an extra "kick" to rotation of shaft 312 as the wobbly ball falls or rolls to the bottom of the cylinder, aiding the user in rotating the shaft, at least as the wobbly ball is falling or rolling downward. The eccentric movement characteristics of the wobbly ball described above may further provide an extra "kick". The illustrated configuration shows 2 wobbly ball engines 315 (i.e., 2 cylinders) on each side of paddle 332, each of which may be oriented so that the 4 ends are each about 90° apart from one another, allowing a wobbly ball (on each side, for each user) to fall every 90° of rotation, providing the above described extra "kick" every 90°. Other embodiments including fewer (only 1) or more (e.g., 3 or more) wobbly ball engines on each side could alternatively be provided. Such a catamaran shell (without the wobbly ball engines) is commercially available, and could be retrofitted as described.

For each of the devices shown in FIGS. 23-27, and the boat of FIGS. 28A-28B, the wobbly ball engine (and any manually applied power through push handle 208 or pedals 330) may be the only source of power for the device (i.e., no other engine (internal combustion, or electric) may be provided).

In another embodiment, one or more of the wobbly balls may be used in the generation of electricity, through a power generating wobbly ball 400. For example, the inner ball 104 may be magnetized. The wobbly ball 100 may be disposed so that the magnetized inner ball 104 passes or move over, within, or about an electrical coil 440, so that as the wobbly ball with its magnetized inner ball moves relative to the coil 440, an electrical current is generated (induced) in the coil. Batteries 442 may be disposed about the coil or ball 100 and connected thereto so that the current induced within the induction coil 440 charges the batteries (or capacitors, in other embodiments). If needed, shell body 102 may be formed of an insulating material (e.g., plastic, insulative composite, or other insulating material or layer), rather than the steel that may typically be used in the wobbly ball body 102. An outer casing 443 may be provided, which could maintain the same eccentric shape characteristics of encased wobbly ball 100. In another embodiment, it could be spherical, or of any other desired shape.

Figure 29A:
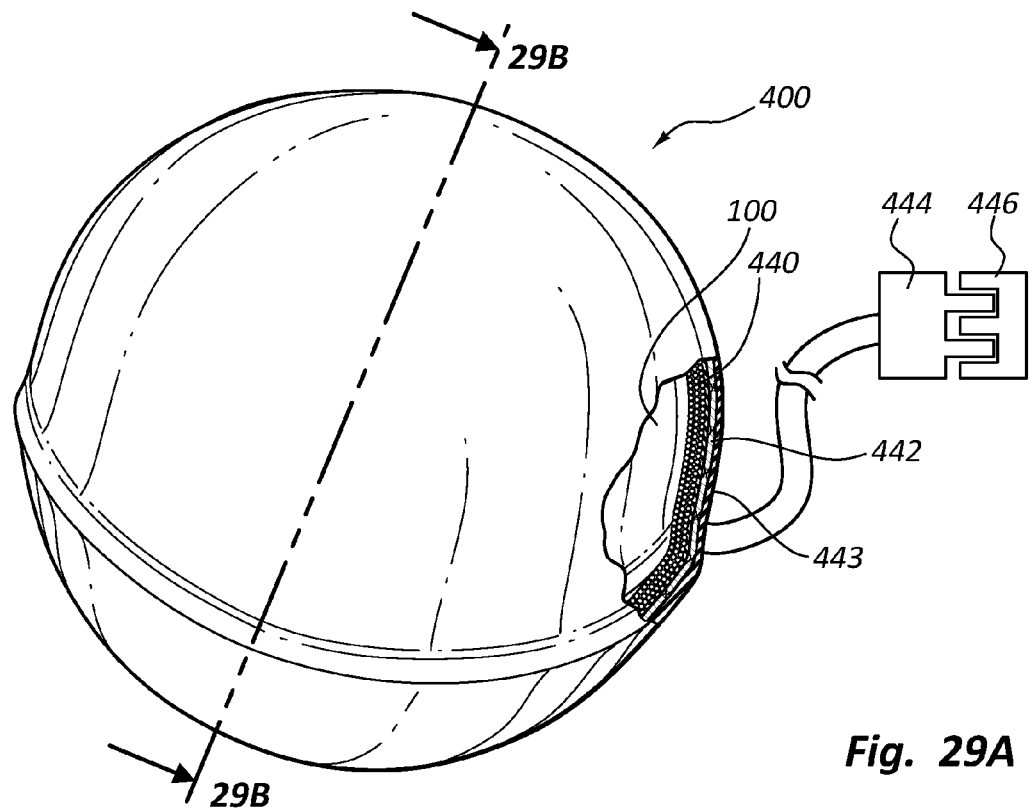
FIGS. 29A-29C illustrate various views of a wobbly ball including an induction coil, and a magnetic inner ball, which are used to charge batteries that may be positioned around the exterior of the wobbly ball and coil as the inner ball of the wobbly ball moves relative to the induction coil.
Figure 29B:
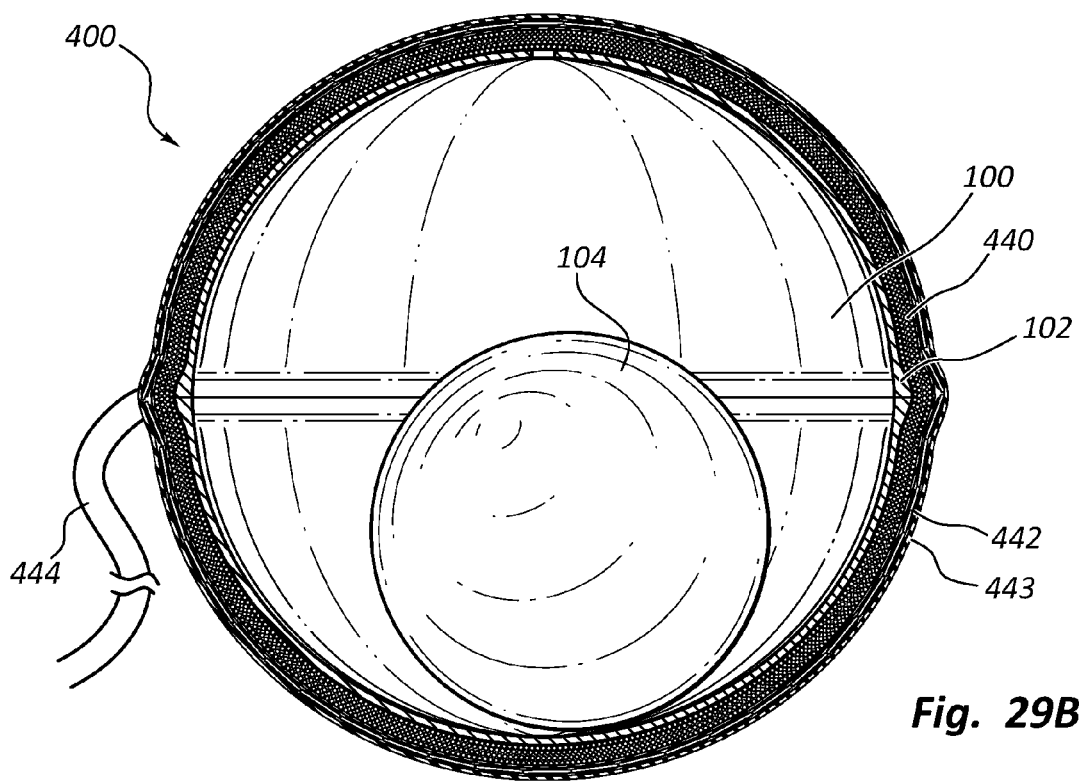
Figure 29C:
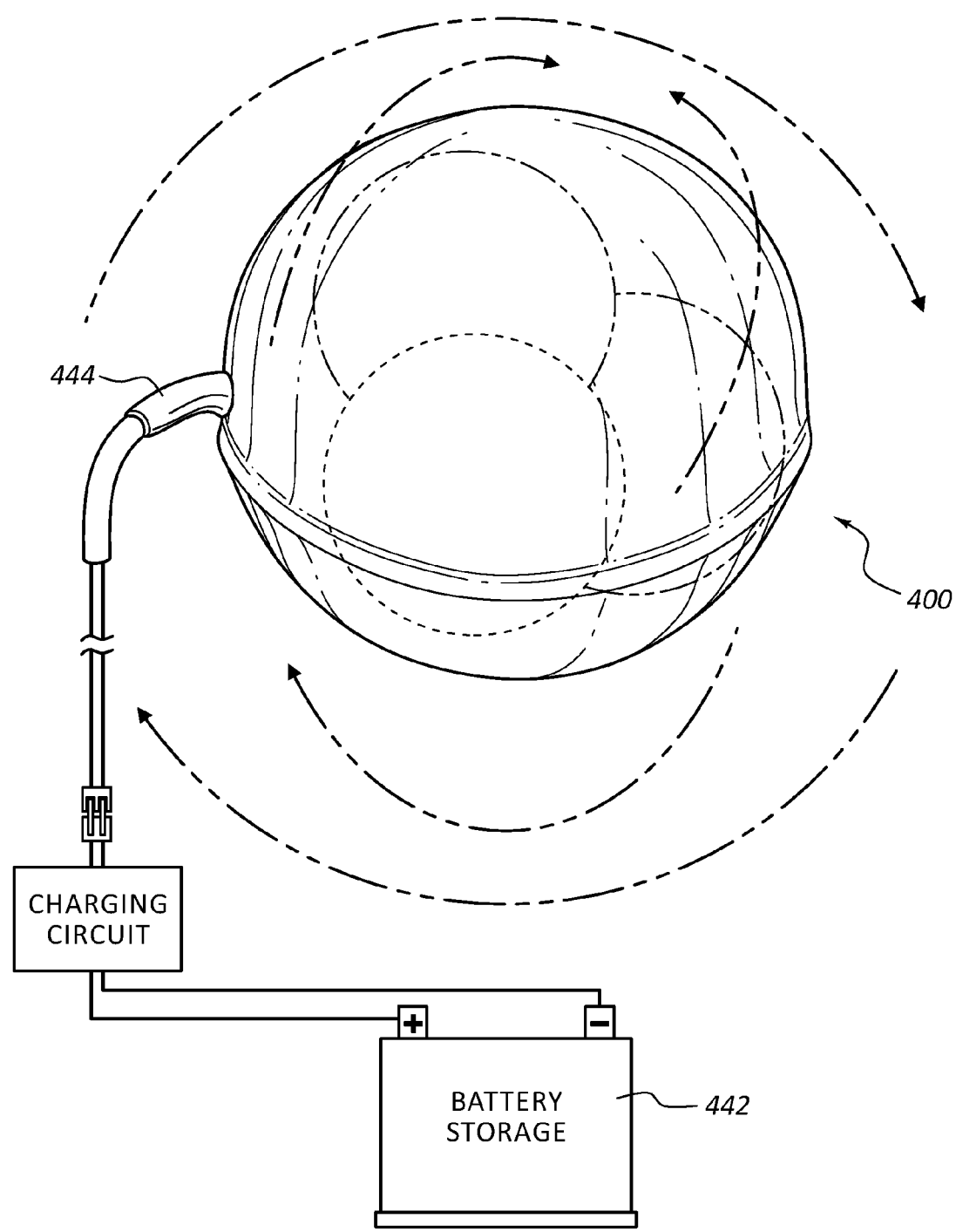

The motion of the wobbly balls may be caused by wind, wave action, placement in a stream or other moving waterway, or by exercise movement of a user. FIGS. 29A-29B schematically illustrate such an embodiment. Such a power generating wobbly ball may include an electrical cord and plug 444 to be plugged into a DC to AC converter, or the power generating wobbly ball may include such a converter, so that the plug 444 may be directly plugged into a wall or other power outlet. As a result of power generation of the wobbly ball, electrical power may be fed into the electrical grid through power outlet 446, rather than drawing power therefrom. This may allow the user to offset some of their other power consumption (i.e., running their electric power meter backwards) with power generated during exercise with the wobbly ball, or by otherwise causing movement of the inner ball 104 relative to coils 440 (e.g., wind, wave, or other action). FIG. 29C illustrates another embodiment of a power generating wobbly ball 400 including a power cord 444, where the batteries 442 to be charged may be external, or not included at all—where the power is simply introduced into the power grid rather than stored in a battery or similar storage structure. The cross-section of such a wobbly ball may be similar to that shown in FIG. 29A-29B, but without the chargeable battery layer 442. FIG. 29C also illustrates schematically the movement of inner ball 104 as the power generating wobbly ball 400 is agitated (e.g., moved, shaken, tossed, etc.).

Although illustrated with a cord and plug 444 extending from power generating wobbly ball 400, it will be appreciated that in another embodiment ball 400 may include a jack into which a power cord can be plugged. Such a jack may be covered by an elastomeric (e.g., rubber) door that flips open. Thus, the wobbly ball may include a generally smooth exterior surface over where the cord may selectively be plugged in (e.g., by opening the door and attaching the cord into the jack or port). Such a jack may resemble those in a digital camera or other devices including output jacks covered by a protective door. Furthermore, in an embodiment, two halves (e.g., top and bottom) of the ball may screw together, if it is desired to access any of the inner components, or to replace a wobbly ball 100 with another, etc.

Such a protective door may be helpful when using wobblies in conjunction with wave action in water to generate electricity. For example, any size wobbly ball (e.g., a 4 inch width) may have a female connector jack built into the power generating wobbly ball, protected by a rubber or other elastomeric water protector door that covers the female electrical jack outlet. A flap of the protective door may snap down, covering the female jack to protect it from water or other damage (e.g., similar to those jacks included in some digital cameras).

Although several applications have been disclosed herein, such as the combination device that may aerate, rake, till, etc., and the boat, it will be appreciated that wobbly balls, wobbly ball engines, and the disclosed springs may be employed in a wide variety of applications. For example, the wobblies and springs have universal value and apply to many machines, physical fitness, physical therapy, and work to the benefit of solving or improving many physical, psychiatric, and social illnesses and conditions. They can be used with sports boats as described herein, or any boat, car, race car that is run for speed (e.g., on salt flats). Such vehicles may be powered solely by the wobbly ball engine, and any occupants (e.g., which may apply power through foot or hand pedals, etc.). Any of the machines or vehicles may be run in combination with solar power, or even a small electric or combustion engine to generate the gyro function to start and continue the function of the machine including one or more wobbly ball engines.

Wobblies can also be used in developing countries (e.g., $3^{rd}$ world), or other countries to generate electricity, run grain mills, drill (e.g., for water), pump water, making light, etc. so that students can run computers or other devices, or to provide electricity for making meals, etc. For example, a grain mill, drill, or pump may include wobbly ball engines mounted on handles that a user rotates to run the pump, drill, mill, etc. The wobbly ball engines may provide augmented power, as described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wobbly ball comprising:
a non-spherical rigid, hollow ball body formed of curved surfaces without any planar faces, formed of two halves, an upper half comprising an upper member and a lower half comprising a lower member, the upper and lower members being welded together along a central seam therebetween and defining a hollow cavity therein; and
a spherical ball captured within the hollow cavity of the hollow ball body, the spherical ball being unconstrained and free to roll throughout the entirety of the hollow cavity within the hollow ball body;
wherein the central seam comprises a lip positioned about an equator of the hollow ball body, the lip projecting outwardly such that the lip at the central seam defines a maximum width of the hollow ball body.

2. A wobbly ball as recited in claim 1, wherein the spherical ball captured within the hollow cavity is solid rather than hollow.

3. A wobbly ball as recited in claim 1, wherein the spherical ball captured within the hollow cavity accounts for more than 90% of the weight of the wobbly ball.

4. A wobbly ball as recited in claim 1, wherein the spherical ball captured within the hollow cavity has a diameter that is not more than 50% of the height and width of the hollow ball body within which it is captured.

5. A wobbly ball as recited in claim 1, wherein the non-spherical hollow ball body has a maximum width that is greater than its maximum height.

6. A wobbly ball as recited in claim 1, wherein the spherical ball captured within the hollow cavity is a musical ball.

7. A combination device for aerating, raking, tilling, mowing, or rolling, the device comprising:
a frame;
an active interchangeable head for aerating, raking, tilling, mowing, or rolling attachable to the frame;
wheels attached to an axle of the frame;
one or more wobbly ball engines fixedly attached to the axle, each wobbly ball engine including a wobbly ball as recited in claim 1, trapped within a cylindrical canister so that the wobbly ball rolls or falls within the canister as the axle rotates as the device is pushed.

8. A combination device as recited in claim 7, wherein the device does not include any engine other than the one or more wobbly ball engines.

9. A paddle boat powered by a wobbly ball engine, the paddle boat comprising:
a paddle boat frame;
one or more pedals attached to a pedal shaft;
a paddle wheel attached to the pedal shaft that rotates in the water to propel the paddle boat as the pedals are pedaled;
one or more wobbly ball engines fixedly attached to the pedal shaft, each wobbly ball engine including a wobbly ball as recited in claim 1, trapped within a cylindrical canister so that the wobbly ball rolls or falls within the canister as the axle rotates as the pedals are pedaled.

10. A power generating wobbly ball comprising:
a wobbly ball as recited in claim 1, wherein the ball captured within the hollow cavity is magnetic;
an induction coil disposed about the hollow ball body of the wobbly ball so that the magnetic ball captured within the hollow cavity can be moves relative to the induction coil as the wobbly ball is agitated; and
a battery or capacitor electrically connected to the induction coil so as to be charged by an electrical current induced in the coil as the wobbly ball is agitated.

11. A power generating wobbly ball as recited in claim 10, further comprising a power cord and plug attached to the wobbly ball configured to deliver generated power into an electrical grid when the plug is plugged into an outlet of the electrical grid.

12. An assembly including a plurality of wobbly balls and one or more exercise coil springs comprising:
a plurality of wobbly balls, each wobbly ball comprising
a non-spherical rigid, hollow ball body formed of two halves, an upper half comprising an upper member and a lower half comprising a lower member, the upper and lower members being welded together along a central seam therebetween and defining a hollow cavity therein; and
a spherical ball captured within the hollow cavity of the hollow ball body;
one or more coil springs each formed of a single coiled wire, each spring including a central portion where the coiled wire is coiled to a first diameter that is constant throughout the central portion, and opposed flared ends on either side of the central portion where the coiled wire is progressively coiled from the first diameter to a second diameter that is larger than the first diameter; and
a rod extending through the coil springs and having a wobbly ball attached to each opposed end of the rod.

13. An assembly as recited in claim 12, wherein the first diameter of the central portion of the coiled wire is about 5/8 inch.

14. An assembly as recited in claim 13, wherein the second diameter of the opposed flared ends of the coiled wire is about 1.25 inch.

15. An assembly as recited in claim 13, wherein the second diameter of the opposed flared ends of the coiled wire is about 2 inches.

16. An assembly as recited in claim 12, wherein the first diameter of the central portion of the coiled wire is about 1 inch.

* * * * *